United States Patent
Rastegar et al.

(10) Patent No.: US 6,805,337 B1
(45) Date of Patent: Oct. 19, 2004

(54) APPARATUS FOR ISOLATION OF PAYLOADS WITH LOW TRANSMISSIBILITY

(75) Inventors: Jahangir S. Rastegar, Stony Brook, NY (US); Ronald Rothchild, Bethpage, NY (US); Farshad Khorrami, Brooklyn, NY (US)

(73) Assignee: OmniTek Research & Development, Inc., Melville, NY (US)

( * ) Notice: Subject to any disclaimer, the term of this patent is extended or adjusted under 35 U.S.C. 154(b) by 0 days.

(21) Appl. No.: 09/517,434

(22) Filed: Mar. 2, 2000

(Under 37 CFR 1.47)

(51) Int. Cl.$^7$ ................................................ F16M 1/00
(52) U.S. Cl. ........................................ 267/136; 267/153
(58) Field of Search ................................. 248/351, 550; 267/136, 141, 152, 153, 35

(56) References Cited

U.S. PATENT DOCUMENTS

| | | | | |
|---|---|---|---|---|
| 3,191,896 A | * | 6/1965 | Nathan | 248/22 |
| 3,322,379 A | * | 5/1967 | Flannelly | 248/20 |
| 3,794,277 A | * | 2/1974 | Smedley et al. | 248/20 |
| 3,834,257 A | * | 9/1974 | Ganser | 82/44 |
| 4,033,541 A | * | 7/1977 | Malueg | 248/358 R |
| 4,057,212 A | * | 11/1977 | Schubert | 248/358 R |
| 4,068,825 A | * | 1/1978 | Macpherson | 254/124 |
| 4,270,393 A | * | 6/1981 | Osborne et al. | 74/5 F |
| 4,699,257 A | * | 10/1987 | Lloyd | 188/380 |
| 4,822,011 A | * | 4/1989 | Goldbach et al. | 267/201 |
| 4,887,699 A | * | 12/1989 | Ivers et al. | 188/378 |
| 4,981,381 A | * | 1/1991 | Murata | 400/661 |
| 5,052,529 A | * | 10/1991 | Sutcliffe et al. | 188/378 |
| 5,127,622 A | * | 7/1992 | Whelpley et al. | 248/550 |
| 5,199,690 A | * | 4/1993 | Marshall | 267/64.25 |
| 5,305,981 A | * | 4/1994 | Cunningham et al. | 248/550 |
| 5,310,157 A | * | 5/1994 | Platus | 248/619 |
| 5,315,890 A | * | 5/1994 | Long | 74/110 |
| 5,370,352 A | * | 12/1994 | Platus | 248/619 |
| 5,564,537 A | * | 10/1996 | Shoureshi | 188/380 |
| 5,645,260 A | * | 7/1997 | Falangas | 248/550 |
| 5,732,802 A | * | 3/1998 | Tsukagoshi | 188/378 |
| 5,794,909 A | * | 8/1998 | Platus et al. | 248/550 |
| 5,845,896 A | * | 12/1998 | Riad | 267/221 |
| 5,855,260 A | * | 1/1999 | Rubin | 188/378 |
| 5,890,695 A | * | 4/1999 | Brewer, III | 248/638 |
| 5,971,375 A | * | 10/1999 | Simonian et al. | 267/136 |
| 6,022,005 A | * | 2/2000 | Gran et al. | 244/164 |
| 6,059,274 A | * | 5/2000 | Owen et al. | 267/136 |
| 6,196,531 B1 | * | 3/2001 | Makino et al. | 267/292 |
| 6,223,483 B1 | * | 5/2001 | Tsukagoshi | 52/167.1 |
| 6,241,059 B1 | * | 6/2001 | Fujita et al. | 188/267 |
| 6,389,900 B1 | * | 5/2002 | Leist et al. | 73/662 |

FOREIGN PATENT DOCUMENTS

| | | | | |
|---|---|---|---|---|
| JP | 61175332 A | * | 8/1986 | |
| JP | 6217437 A | * | 1/1987 | |
| JP | 927682 A | * | 1/1997 | |
| JP | 11336830 A | * | 12/1999 | |
| JP | 2000-193031 A | * | 7/2000 | |

* cited by examiner

Primary Examiner—Robert A. Siconolfi
(74) Attorney, Agent, or Firm—Scully, Scott, Murphy & Presser

(57) ABSTRACT

A payload isolation system for isolating a payload from a base structure upon which the payload is supported. The payload isolation system includes: a motion constraint for maintaining a parallel relationship between the payload and the base structure; and a support for providing vertical and/or lateral support of the payload relative to the base structure such that the transmission of vertical and/or lateral vibration between the payload and the base structure are suppressed. The support means preferably exhibits nonlinear elastic characteristics in response to an effective weight of the payload. The non-linear elastic characteristics preferably include a substantially rigid characteristic at low and high levels of deformation and a compliant characteristic at intermediate levels of deformation. In yet another preferred implementation, the motion constraint means are mechanical linkages.

38 Claims, 20 Drawing Sheets

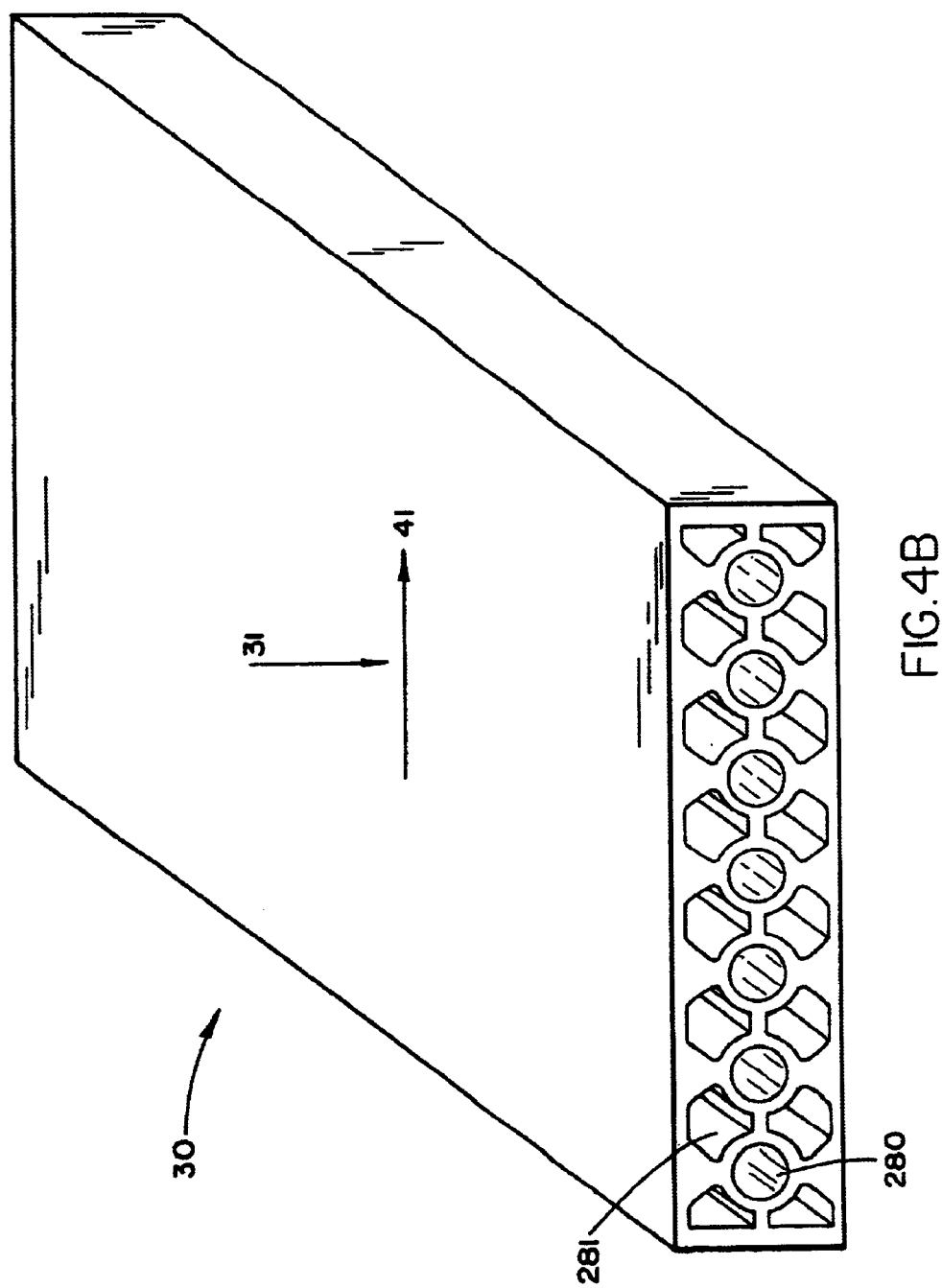

APPARATUS FOR ISOLATION OF PAYLOADS WITH LOW TRANSMISSIBILITY

BACKGROUND OF THE INVENTION

1. Field of the Invention

The field of art to which this invention relates is an apparatus for semi-active isolation of payloads with low transmissibility, and more particularly to an apparatus having semi-active means for isolating vibration of a payload from a base structure.

2. Description of the Related Art

Traditionally, one of two approaches have been used to isolate a payload from the vibrations of a base structure. Either the payload is very rigidly connected, to the base structure such that it could withstand the effects of the vibrations or the payload is connected to the base structure by vibration damping elements such that the payload is free to move relative to the base structure.

In certain applications, the former approach is impractical because of the extra material and weight needed to make the very rigid connection between the payload and base structure. Launch vehicles are one such application. The heavier a launch vehicle is, the more thrust is needed to lift it to its predetermined destination. Added thrust means bigger, heavier, and more expensive engines which transmit even more vibrations to the payload.

The latter approach also has its disadvantages in certain applications, such as launch vehicles. Referring to FIG. 19, there is illustrated a schematical representation of a conventional launch vehicle 400 having a payload 101, a base structure 102, engines 403 fixed to the base structure 102, damping elements 404 disposed between the base structure 102 and the payload 101, and a fairing 405 covering the payload 101 and base structure 102. The payload 101 generally houses sensitive electronics and other sensitive equipment that is prone to failure due to vibrations that can be transmitted to the payload 101 through the base structure 102 by the engines 403. As the launch vehicle 400 travels, the effective weight of the payload 101 varies due to the acceleration of the launch vehicle 400 as well as changing mass of the launch vehicle 400 (due to the consumption of fuel which powers the engines 403).

The damping elements 404 generally require a relative movement between payload 101 and the base structure 102 in the vertical (axial) and horizontal (lateral) directions. Unfortunately, these damping elements also allow some rotation of the payload 101 with respect to the base structure 102. Since the height of the launch vehicle payload is typically great, even a slight rotation of the payload results in a large displacement near the top of the payload 101. However, the fairing 405 of the launch vehicle 400 typically only has approximately one inch of clearance between its inner surface and the outer surface of the payload 101. Thus, to avoid contact between the fairing 405 and the payload 101 even the slightest rotation cannot be tolerated.

To counter this problem, heavy, active rotational restraint systems are necessary, typically comprising at least three voice coil motors which direct a restoring force to the payload to keep it from rotating. A feedback system senses the rotation of the payload 101 and signals the motors to direct force accordingly. Such an active system is heavy, complicated, and prone to failure. Furthermore, such an active system requires electrical power to drive the motors which is either siphoned from the engines or stored in heavy batteries. Neither of which is very desirable in a launch vehicle.

For the above reasons, there is a need in the art for a payload isolation system which is low weight, uncomplicated, does not permit rotation of the payload relative to the base structure, and preferably mechanical which operates in a passive or semi-active mode so as not to be prone to failure or require an undesirable energy drain.

SUMMARY OF THE INVENTION

Therefore, it is an object of the present invention to provide an apparatus for isolating a payload from a base structure upon which it is supported so as to suppress the transmission of vertical (axial) and/or horizontal (lateral) vibration between the payload and base structure.

It is a further object of the present invention to provide an apparatus for maintaining effective isolation in the presence of varying effective payload weight, which may be due to either variation of the vertical acceleration field or of the payload mass, or both.

It is yet a further object of the present invention to provide an apparatus for maintaining the natural frequency of vertical isolation means substantially constant and low while accommodating the variations in the effective weight with substantially no variations in the deflection.

It is yet a further object of the present invention to provide an apparatus for providing an automatic or convenient manual means to adjust the isolation for variations in the effective payload weight and optimize for lowest practical natural frequency.

It is yet a further object of the present invention to provide an apparatus for providing the desired isolation entirely passively, i.e., with no expenditure of energy, during periods when the payload is substantially fixed and when the payload varies, by using active means solely to adjust the parameters of the passive system to compensate for payload variation, i.e., by constructing a semi-active means of control.

It is yet a further object of the present invention to provide an apparatus for preventing the transmission of vertical and lateral vibration forces, prevent any relative rotational motion between the base and the payload.

It is still yet-a further object of the present invention to provide an apparatus for preventing excessive buildup of destructive resonant oscillations if the natural frequency of the isolation system should overlap with the spectrum of vibrational excitation to which it is exposed.

The present invention provides a novel means for passively isolating a payload from a base structure, upon which it is supported, to prevent transmission of both vertical (axial) and lateral vibration between. the payload and base structure, while providing for active parameter adjustment to compensate for changes in the payload mass or effective weight or the required isolation spectrum with very low cost in terms of power consumption, weight and volume. Here, lateral is defined for the purposes of the invention as being orthogonal to the quasi-static acceleration field, i.e., the vertical (axial) direction. The quasi-static acceleration in this context may be, for example, gravity or the average gross acceleration of a vehicle carrying the payload. The acceleration is considered to be quasi-static when its variation is slow compared with the frequency of structural vibrations being isolated.

With the present invention, vertical and lateral transmissibility of vibration is substantially reduced above a relatively low system natural frequency, such as above about 5–10 Hz, which requires a relatively low effective isolation system spring rate for a given payload mass, while the static or quasi-static spring deflections are simultaneously small. With this invention, such a capability is achieved with a nonlinear elastic element that is relatively rigid at low and at high levels of displacement, but is very compliant at intermediate levels of displacement.

The present invention also provides an improved means for making the system rigid to rotational deflections while simultaneously providing the extreme flexibility to vertical and lateral displacement that is necessary to achieve the low system natural frequency that is required for the desired low vertical and lateral vibration force transmissibility. This is achieved by mechanically constraining the rotational motion of the payload relative to the base structure, with variations of properly placed one or more parallelogram linkages.

Moreover, the present invention also provides improved means for preventing buildup of resonant oscillations when the system is subject to vibrational excitation at frequency near its natural frequency. The improved means utilizes nonlinear elasticity such that the natural frequency of the system in the vertical direction and if desired in the lateral directions stays nearly constant at only small amplitudes of vibrational displacements. At larger amplitudes of vibrational displacements, due to the nonlinearity of the spring rate, its effective spring rate changes, thereby shifting the natural frequency of the system, thereby effectively preventing resonance without degradation in the performance of the isolation system.

A typical payload isolation system constructed in accordance with the present invention consists of several functional elements including motion constraint means, vertical load support means and adjustment means, active driver means, accessories that may be required if the system is to be entirely self powered and self contained, and elastic means for lateral isolation. In an integrated design, it is possible and may sometimes be efficient that two or more functional means as defined above will be represented in a single physical component.

In a system according to the present invention, the motion constraint means will preferably be a structural arrangement consisting of one or more parallelogram linkages that have the function of preventing the payload from rotating relative to the base structure. In addition, this element may also be used for the support of the quasi-static vertical load, or control of vertical and/or lateral vibration, by utilizing such linkages in complementary pairs or by restraining the motion of certain links elastically. In the latter situation, the parallelogram linkage may be made to bear part or all the structural loads that result from such restraint.

Moreover the same system can also be made flexible with respect to and isolate, vibrations that are rotational about the vertical axis. In general, this does not require additional functional components or types of components but is a function of the details of the isolation design, particularly the flexibility of the links of the parallelogram linkages in the directions that contribute to the aforementioned rotation.

The vertical load support means is the component or set of components that supports the primary quasi-static effective weight of the payload. It preferably includes nonlinearity in its force-deflection characteristic such that the primary quasi-static load is borne with relatively little deflection at an effective operating point. The second function of the said force-deflection nonlinearity is to provide relatively large deflections in the presence of small variations in the effective load due to the low effective dynamic spring rate at the operating point. The third function of the said force-deflection nonlinearity is to provide the support means with the capability to bear more substantial increases in the effective load with relatively small additional deflections due to substantial rises in the effective spring rate for deflections higher than and outside the vicinity of the operating point. The effective spring rate of the system in the vicinity of the operating point is preferably low enough to permit a relatively low natural frequency of vibration, e.g., in the range of 5 to 10 Hz in concert with the payload mass. It is also possible that the vertical load support means may be comprised of several components acting in parallel and in series, such as a linear spring in series with a structural component exhibiting a nonlinear elastic behavior, i.e., force-deflection characteristics.

In one preferred embodiment of the invention, the vertical load support means is comprised of an array of elastomeric structures that "buckle" under load. It is preferable that the formulation of elastomeric material of which these structures are made be selected to exhibit the lowest possible damping characteristics. The array of structures, which would be designed and proportioned to "buckle" at a threshold load, may be in a variety of forms such as, for example, molded arches, or tubes each of which represents two symmetrically opposed semi-circular or appropriately designed curved arches, or vertical columns, or pairs of symmetrically non-vertical columns.

Each of these geometries will impart different properties to the support means, particularly in regard to non-vertical elastic characteristics and means of adjustment. However, all the variations share in common the feature that they can be designed to exhibit the desired nonlinearity in the vertical force-deflection characteristic.

One of the advantages of the preferred embodiment as buckling elastomeric structures is the degree of design flexibility offered by this class of structures. The spring rate in the vicinity of the operating point can be made to be very small and even zero or negative, as compared to the spring rate for large deflections, as desired to satisfy the requirements of a specific application.

The desired nonlinearity in elastic characteristics can also be approximated, for example, with one or more pneumatic or nominally linear springs held in preload at threshold levels of deflection, or by applying force through a nonlinear linkage such that the mechanical advantage through which a spring applies force increases or decreases with deflection in a predetermined way to compensate for and effectively modify the linear spring rate. Moreover, any combination of such methods may be used to obtain the desired characteristic and adjustment capability most economically in the context of the requirements of an application.

Preferably, the vertical load support means is adjustable so that the quasi-static load of effective payload weight may be varied over a substantial range with little or no change in the quasi-static deflection of the system about its operating point. In one preferred embodiment of the invention, the adjustment means is inherent in the construction of the vertical support means which acts as a pneumatic actuator and provides the desired load support adjustment with gas pressure, then its load bearing capability in any position is simply proportional to the amount of gas and gas pressure with which it is filled. The vertical load support means may also be provided by an appropriate external mechanism, such as for example a linkage or cam, to effect the adjustment of its load support properties. This external mechanism is what is referred to as the load support adjustment means. Several examples of such mechanisms are described below and in the accompanying figures.

This load support adjustment means is driven by active driver means, which is a transducer that provides the mechanical power and actuation to perform the adjustment. The driver means, which is preferably the only powered element in the system and is what keeps vertical deflection substantially constant in the presence of a varying effective payload weight, is preferably pneumatic but may also be, for example, electrically powered.

Finally, accessories may be required to perform certain functions if the system is to operate in a completely self-contained fashion. For example, a source of stored energy such as a compressed or liquefied gas, batteries or fuel, may be required if the system must operate independently of outside energy sources. Also, a sensor will be required to track deflection of the vertical load support element and provide a feedback signal which will be used to adjust the load support means as described above.

If the form of energy storage and the method of actuation is pneumatic, then it is preferable that the sensor used to track deflection of the payload should also be pneumatic and operate an appropriate control valve directly, rather than convert the sensed condition to a different kind of signal, such as electrical, and then back to pneumatic. However, the payload position relative to the base structure will be fluctuating rapidly due to the vibrations being isolated, and it is desired that the feedback signal to the control valve should represent only an average relative position over many cycles, varying at a slow rate comparable to that of the payload effective weight and quasi-static load variation. Consequently, it is preferred that the sensor and the control valve include low-pass filter means, preferably entirely mechanical in construction and operation, so that the control valve operation does not include a response to relatively high frequency deflections.

The above described functional means comprise the vertical load support and isolation components of the system. If the vibrational excitation does not have a lateral component and only vertical isolation is required, then additional means are not needed and the above described means may comprise the entire system. However, if significant lateral vibration is also present, then lateral isolation means may also be included to provide elastic control of motion in the directions orthogonal to the vertical direction.

The elastic characteristics of the lateral isolation means should preferably also be highly nonlinear. Indeed, its force-deflection curve should preferably resemble that of the vertical load support means, but differing in that it is displaced so that its operating point is at zero force and displacement. In this way, the effective lateral spring rate for small displacements is relatively low to provide for low natural frequency of the system and thereby for low transmissibility, but increases significantly at large displacements to effectively limit the range of motion of the payload relative to the base structure, as well as to provide the frequency shifting effect—similar to what was previously described for the vertical isolation means—to prevent buildup of resonant oscillations.

It is possible that two or more of the functional means described may be combined in a single physical component of an integrated design. However, there may be very great disparities between the magnitudes of the quasi-static load and the vertical and lateral vibrational loads, so that the design of a single component intended to bear more than one of these loads, or to perform more than one related function, may not lead to the most efficient structure or system with respect to weight, volume, power consumption, or cost.

Most generally, it is expected that the system may be comprised of components that are specialized to their functions.

Overall, the present invention provides improved means to isolate a payload from vibration, even at very low frequencies without sacrificing level control and stability of orientation, and without the risk of low frequency resonance. Also provided are means to adjust the isolation system, or even to make it automatically self-adjusting, so that it can accommodate variable effective payload weight with no change in its quasi-static position or deflection. Moreover, these benefits are provided with substantially lower weight, volume and power requirements than prior art systems directed to the same or similar objectives.

Accordingly, the payload isolation system of the present invention is provided for isolating a payload from a base structure upon which the payload is supported. In its basic configuration the payload isolation system comprises: motion constraint means for maintaining a parallel relationship between the payload and the base structure; and support means for providing vertical and/or lateral support of the payload relative to the base structure such that the transmission of vertical and/or lateral vibration between the payload and the base structure are suppressed.

In a preferred implementa the paylisolation system of the present invention, the motion constraint means comprises a mechanical linkage, such as a parallogram linkage and/or a scissor linkage. More preferably, at least two of such linkages are provided and at least two of the linkages are arranged non-parallel to each other.

In another preferred implementation of the payload isolation system of the present invention, the support means exhibits nonlinear elastic characteristics in response to an effective weight of the payload. Preferably, the non-linear elastic characteristics comprise a substantially rigid characteristic at low and high levels of deformation and a compliant characteristic at intermediate levels of deformation.

Also provided is a motion constraint mechanism. The motion constraint mechanism comprises: a first mechanical linkage disposed between a payload and a base structure; and at least a second mechanical linkage arranged relative to the first mechanical linkage such that the first and at least second mechanical linkages maintain a parallel relationship between the payload and the base structure. Preferably, the first and at least second mechanical linkages are arranged non-parallel to each other.

In a preferred implementation of the motion constraint mechanism of the present invention at least one of the first or at least second mechanical linkages comprises a parallelogram linkage disposed between the payload and base structure.

Preferably, each of the parallelogram linkages comprises first and second parallelogram sub-linkages. The first and second parallelogram sub-linkages sharing a common member. One of the first or second parallelogram sub-linkages is fixed to the payload or a portion thereof, the other of the first or second parallelogram sub-linkages is fixed to the base structure or a portion thereof.

In another preferred implementation of the motion constraint mechanism of the present invention, at least one of the first or at least second mechanical linkages comprises a scissor linkage having first and second scissor sub-linkages disposed between the payload and base structure. The first and second scissor sub-linkages are connected to each other by first and second common members. A first end of each of the first and second scissor sub-linkages is fixed to the payload or a portion thereof and a second end of the first and second scissor sub-linkages is fixed to the base structure or a portion thereof.

Also provided is a support apparatus for providing vertical and/or lateral support of a payload relative to the base structure such that the transmission of vertical and/or lateral vibration between the payload and the base structure are suppressed. The support apparatus comprises: a deformable member exhibiting nonlinear elastic characteristics in response to an effective payload weight; support adjustment means for supporting the effective payload weight; and effective payload adjustment means for adjusting the level of support of the support means in response to a varying effective payload weight. The deformable member preferably has at least one internal tubular cavity and more preferably a plurality of internal tubular cavities interconnected to each other such that the plurality of internal tubular cavities act as a single cavity.

In a preferred implementation of the support apparatus of the present invention, the effective payload adjustment means comprises feedback means for sensing a change in relative distance between the payload and the base structure and controlling the support adjustment means in response thereto.

BRIEF DESCRIPTION OF THE DRAWINGS

These and other features, aspects, and advantages of the apparatus and methods of the present invention will become better understood with regard to the following description, appended claims, and accompanying drawings where:

FIG. 4b illustrates an isometric view of the vertical load support means of FIG. 4a.

DETAILEED DESCRIPTION OF THE PREFERRED EMBODIMENTS

Figure 1:
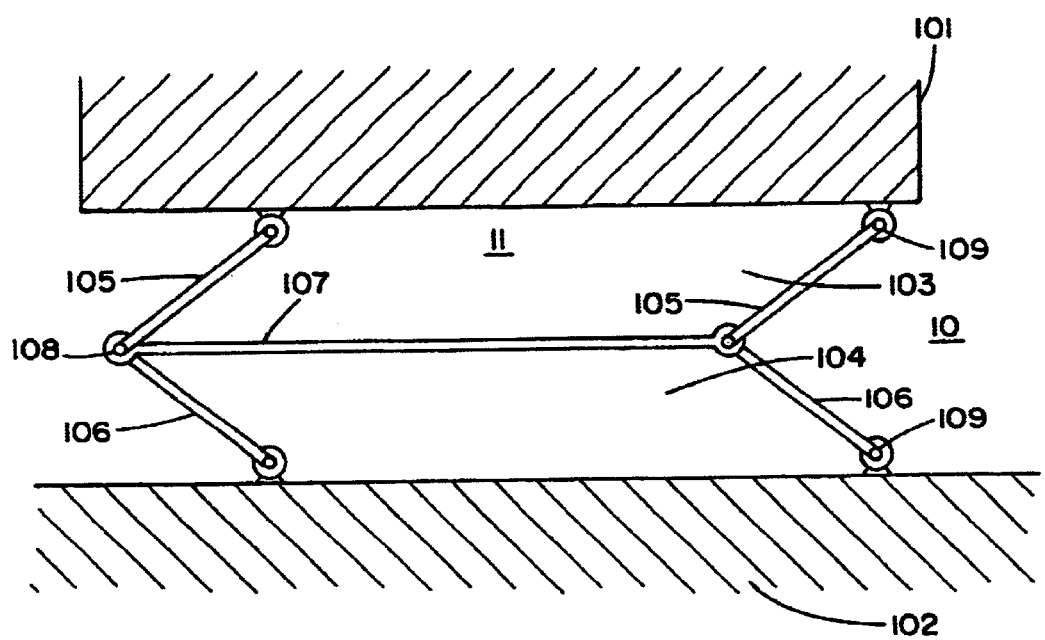
FIG. 1 illustrates a schematic representation of the basic parallelogram linkage of the present invention disposed between a base structure and a payload.

Although this invention is applicable to numerous and various applications, it has been found particularly useful in the environment of isolating vibrations between a payload and base structure of a launch vehicle. Therefore, without limiting the applicability of the invention to launch vehicles, the invention will be described in such environment.

The present invention is a novel system and equipment for isolating a payload from a base structure upon which it is supported so that the transmission of vibration between the two is reduced. A very low natural frequency of the payload on the isolation system is obtainable, such as in the range of about 5 Hz to 10 Hz, by providing an effective dynamic spring rate that is very low relative to payload mass. Preferably, however, the static or quasi-static deflection of the system due to payload weight is small, because of a nonlinearity provided in the force-deflection characteristics of the vertical load support means. At deflection near the operating point, which is the deflection under the static or quasi-static load, the marginal spring rate, which is the effective dynamic spring rate, is very low. However, at deflections that deviate significantly either above or below that operating point, the load support becomes relatively stiff with high spring rate. Thus, the system can support a high static or quasi-static load with very little deflection, but is very compliant about the operating point to which it is adjusted to support that static or quasi-static load. It is also not subject to buildup of resonant oscillations at the natural frequency because, if there is any increase in the amplitude of vibrations, the nonlinearity in the force-deflection characteristics of the vertical load support means will shift the effective natural frequency of the system thereby reducing the system excitation is resonance. When appropriately designed, the nonlinearity can also shift the energy of vibration to higher frequencies where they can be easily damped and controlled. When appropriate, the operating point may be set at higher spring rate points where the curvature of the force-deflection curve is more significant, thereby increasing the shift of the energy of vibration to the higher frequency harmonics, and/or affecting the rate of change in the effective spring rate with increased amplitudes of vibrational displacements, and even obtain an intermediate reduction in the spring rate with increased amplitudes of vibrational displacement.

Significant deviation from the operating point, in this context, is a distance substantially exceeding the maximum expected amplitude of the disturbing vibrations.

The preferred implementation of the payload isolation system of the present invention includes motion constraint means in which a number of parallelogram linkages kinematically prevent payload rotation relative to the base structure. In addition, depending on the number and configuration of such linkages and the details of the link design in the motion constraint means, they may also be used to provide isolation elasticity and control and to support the quasi-static load.

The disclosed isolation system can operate with varying effective payload weight by virtue of being adjustable for greater or lesser effective payload weight without deviation in the quasi-static deflection. Depending on the details of support means design, a load support adjustment means is generally required, functioning as an external mechanism acting on the load support means to perform this adjustment. It may perform its function, for example, by exerting force or gas or fluid pressure to change the geometry of the load support means and thereby its mechanical advantage, or by increasing and decreasing the degree of preload on its elastic elements. It will be clear that this function requires mechanical power, which will be provided by appropriate drive means, preferably pneumatic, and preferably using stored compressed or liquefied gas as an energy source.

It can be seen that the system is preferably controlled by a feedback loop, to actively maintain the quasi-static deflection at a preset level. That feedback loop preferably includes sensor means to detect the deviation of deflection from a preset level, and pneumatic valve means to control the flow of gas to the load support adjustment drive means, and preferably to the load support means as well, to provide the power to drive vertical deflection back to a reference level defined as the operating point.

Preferably the sensor and valve means also includes low-pass filter means such that the valve means does not respond to deflections that vary at frequencies in the range of vibrations being isolated, but responds only to relatively slow variations of the quasi-static load and deflection, and preferably the entire subsystem including sensor and valve and low-pass filter means is mechanical and pneumatic, with no conversion to and from an electrical intermediate for transmission or processing.

Additional features and the manner of operation of the invention will be further understood by reference to the Figures.

FIG. 1 shows a configuration of the most basic form of motion constraint means 10, which is comprised of a single set of parallelograms in what is considered for the purposes of this disclosure to be a single linkage 11. In general, there are at least two parallelograms including, in the illustrated embodiment, an upper parallelogram 103 and a lower parallelogram 104, or more generally one above the other and sharing a common horizontal link. The upper and lower parallelograms 103, 104 can be considered to be sub-linkages of linkage 11. The upper parallelogram 103 is defined and bounded by the upper supporting links 105, horizontal link 107, and payload 101. It will be readily seen that payload 101, while not fashioned in the form of a link, serves functionally as the fourth link in the upper parallelogram. The lower parallelogram 104 is defined and bounded by lower supporting links 106, horizontal link 107, and base structure 102. It is readily seen that the base structure 102 serves functionally as the fourth link in the lower parallelogram, in manner structurally analogous to the function of payload 101 in the upper parallelogram. Thus, it will be seen that the single horizontal link 107 is both the bottom link of the upper parallelogram 103 and the top link of the lower parallelogram 104.

Both payload 101 and base structure 102 are kinematically constrained by the parallelograms to be parallel to horizontal link 107 as illustrated. Therefore, the payload 101 and the base structure 102 are constrained to remain parallel to each other, and this is the most basic function of the parallelogram linkages and is the common function among any form that the motion constraint means 110 may take. At each end of the linkage 11, upper supporting link 105 is joined to lower supporting link 106 and horizontal link 107 by pin joint 108. A pin joint 108 is a hinge that provides a rotational axis about which any or all of the links so joined can rotate with a single degree of freedom, such that all three of the links so joined are constrained to remain effectively coplanar or in parallel planes. Consequently, the upper parallelogram 103 and the lower parallelogram 104, are also constrained to remain effectively coplanar or in parallel planes, so that the entire linkage 11 effectively lies and moves on a single plane or on parallel planes.

The upper supporting links 105 are joined to the payload 101, and lower supporting links 106 are joined to the base structure 102, by joints 109. Joints 109 may be pin joints similar to joints 108 if provision for possible lateral motion of payload 101 relative to base structure 102, in the direction ii perpendicular to the plane of linkage 11, is not required at these joints. More generally, however, joints 109 are preferably ball joints allowing rotational motion about any axis with minimum resistance.

Where the vibratory motion being isolated is severe and extremely precise position control is not required, for example where the motivation for vibration isolation is to protect equipment and prevent physical damage, then joints 108 and 109 can preferably be ordinary rolling-element or other suitable low friction bearings and ball joints. However, where the impetus for vibration isolation is to maintain extremely precise position control, in the presence of vibrations which are small in structural terms but could interfere with such precise position control, then it will be preferable to utilize structural elastic flexures or living joints to provide the necessary rotational degrees of freedom at joints 108 and 109.

The linkage 11 of motion constraint means 10 appears in FIG. 1 to be supporting the payload 101 above the base structure 102, but it will be clear upon scrutiny that the linkage 11 cannot actually provide any such support. Rather, the linkage 11 by itself only prevents relative rotation of the payload 101 about a vertical axis and about an axis perpendicular to the plane of the parallelograms 103 and 104. When the joints 109 are hinge joints, the rotation of the payload about an axis parallel to the horizontal link of the parallelogram is also constrained, i.e., the payload is prevented from undergoing any rotational motion relative to the base structure. However, when the joints 109 are ball joints, then the payload 101 is free to rotate about an axis parallel to horizontal link 107. In either case, the payload is free to displace vertically and in the horizontal direction, i.e., the direction of the horizontal link 107. When the joints 109 are ball joints, then the payload 101 is free to displace in all three directions relative to the base structure. Absent other means of support, the action of gravity or other vertical acceleration field on the payload 101 would cause the parallelograms 103 and 104 and thereby the linkage 11 to collapse, and the payload 101 would fall onto the base structure 102.

Thus, when ball joints are used at the joints 109, the combination of parallelograms 103 and 104 in the motion constraint means 10 prevents rotation of payload 101 relative to base structure 102 about two of the three orthogonal axes, but allows all other motions. It will be understood that the motion constraint means 10 can be comprised of only a single parallelogram such as either 103 or 104, but in that case its motion will be coupled in a way that is not generally desirable. It should be noted that joints 108 are constrained by lower supporting links 106 to move in an arc, with radius equal to the length of links 106, about joints 109 on base structure 102. If upper parallelogram 103 were not present, and payload 101 replaced horizontal link 107 to rest directly upon lower parallelogram 104, then the motion of payload 101 would also be in the form of an arc. Payload 101 would have fewer degrees of freedom and could not independently move both vertically and horizontally.

Figure 2:
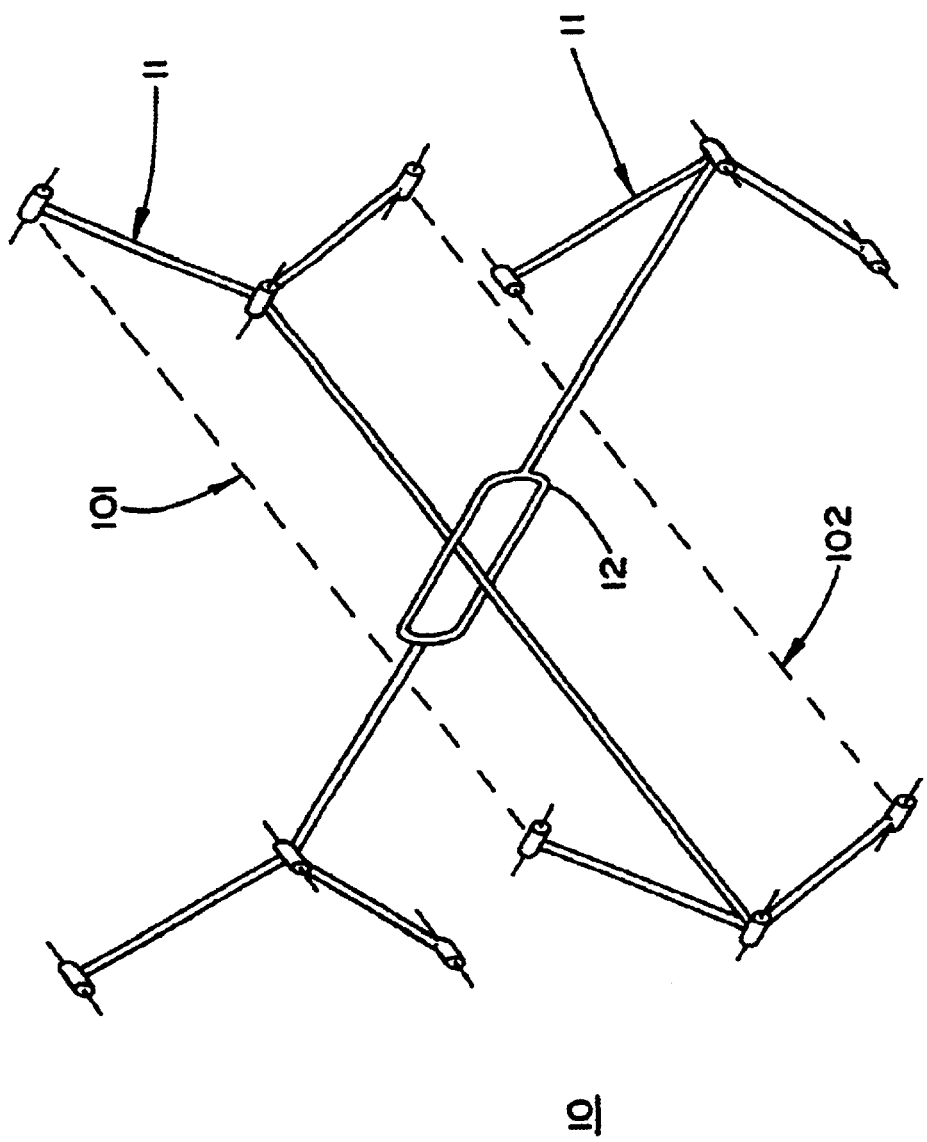
FIG. 2 illustrates a schematic representation of two of the basic parallelogram linkages of FIG. 1 oriented orthogonal to each other between the base structure and payload.

FIG. 2 is an isometric view of a slightly more complex version of motion constraint means 10, having two orthogonal parallelogram linkages 11. The broken line 101 signifies the payload and broken line 102 signifies the base structure under one of the linkages 11. The broken lines are not shown on the other linkage 11, for clarity of illustration, but it will be understood that each of the linkages 11 is completed by the payload 101 above as its topmost horizontal link, and by the base structure 102 below as its bottom horizontal link. To accommodate the crossing of the two horizontal links 107 of the two linkages 11 in the space between payload 101 and base structure 102, one of the links 107 is shown to be divided about its center into a large loop or slot 12, providing a symmetrical structure for the transmission of the tensile and compressive forces borne by each such link, and allowing clearance for the other horizontal link 107 to pass through.

The combination of at least two such linkages 11, oriented so that at least two of their horizontal links 107 are not parallel to each other, provides further control of the motion of payload 101 relative to base structure 102. With such a combination, no relative rotation is kinematically allowed between the payload 101 and the base structure 102 about any axis. However, the payload 101 remains kinematically free to move in translation both vertically and horizontally with respect to the payload 102. In this configuration of the parallelogram linkage placement between the payload 101 and the base structure 102, it is preferable and most efficient to utilize two linkages 11, preferably oriented orthogonal to each other, as illustrated in FIG. 2. However, particularly when the payload 101 is large relative to its distance to the base structure 102, then more than two such linkages 11, properly positioned in a non-parallel manner, may be used.

Figure 18:
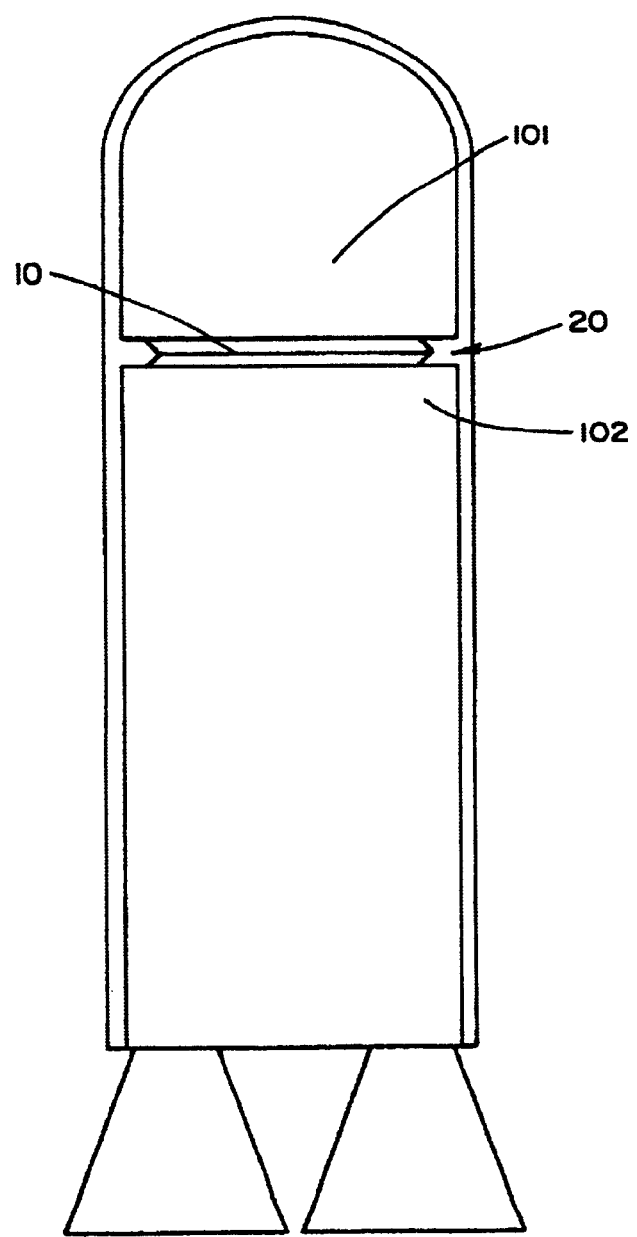
FIG. 18 illustrates a launch vehicle having a vibration isolation system of the present invention disposed between payload and base portions thereof.
Figure 19:
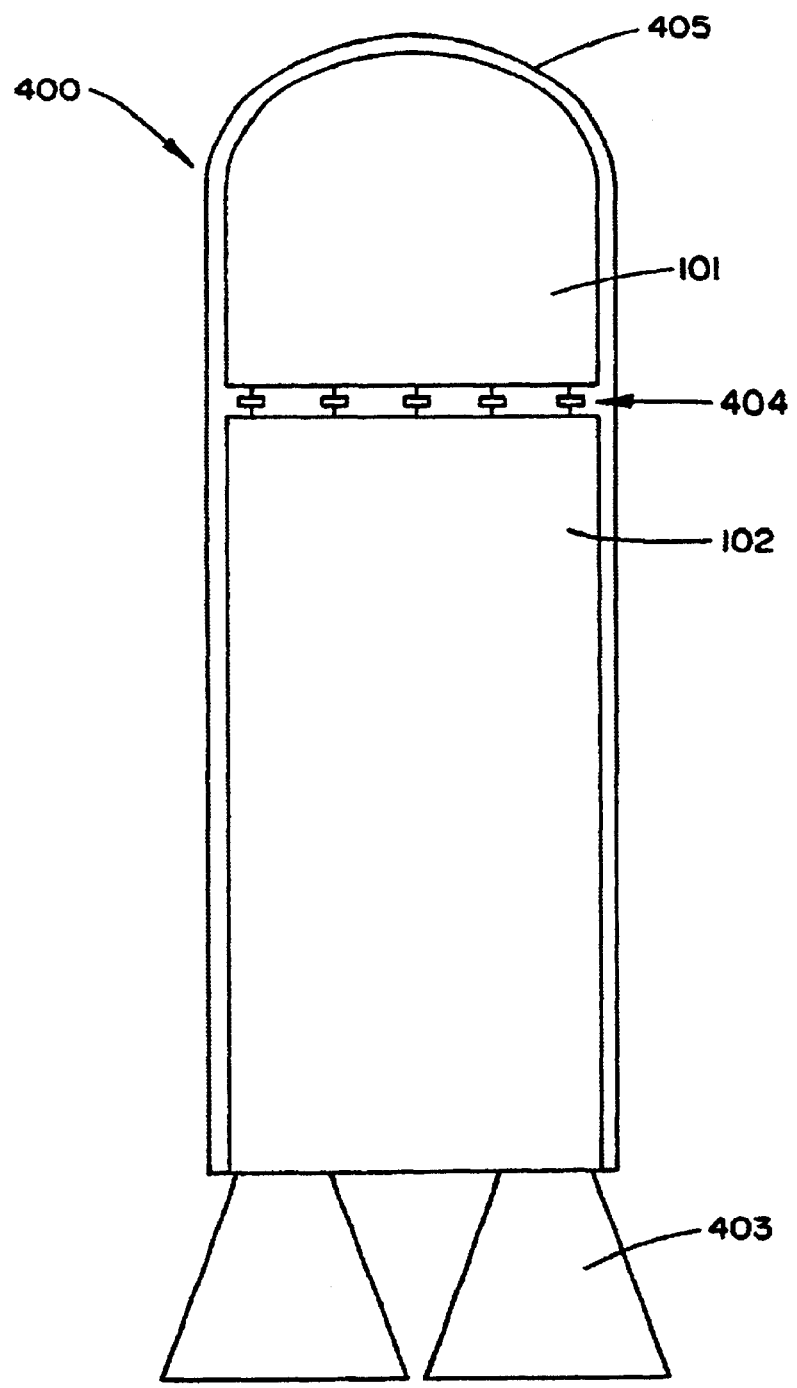
FIG. 19 illustrates a launch vehicle having a conventional approach to payload vibration isolation.

In some applications, such as the launch vehicle illustrated in FIG. 18, it is usually desirable to keep the center portion of the launch vehicle free of obstructions to allow for routing of electrical wires and the like and thus a different configuration may be desirable.

Figure 3:
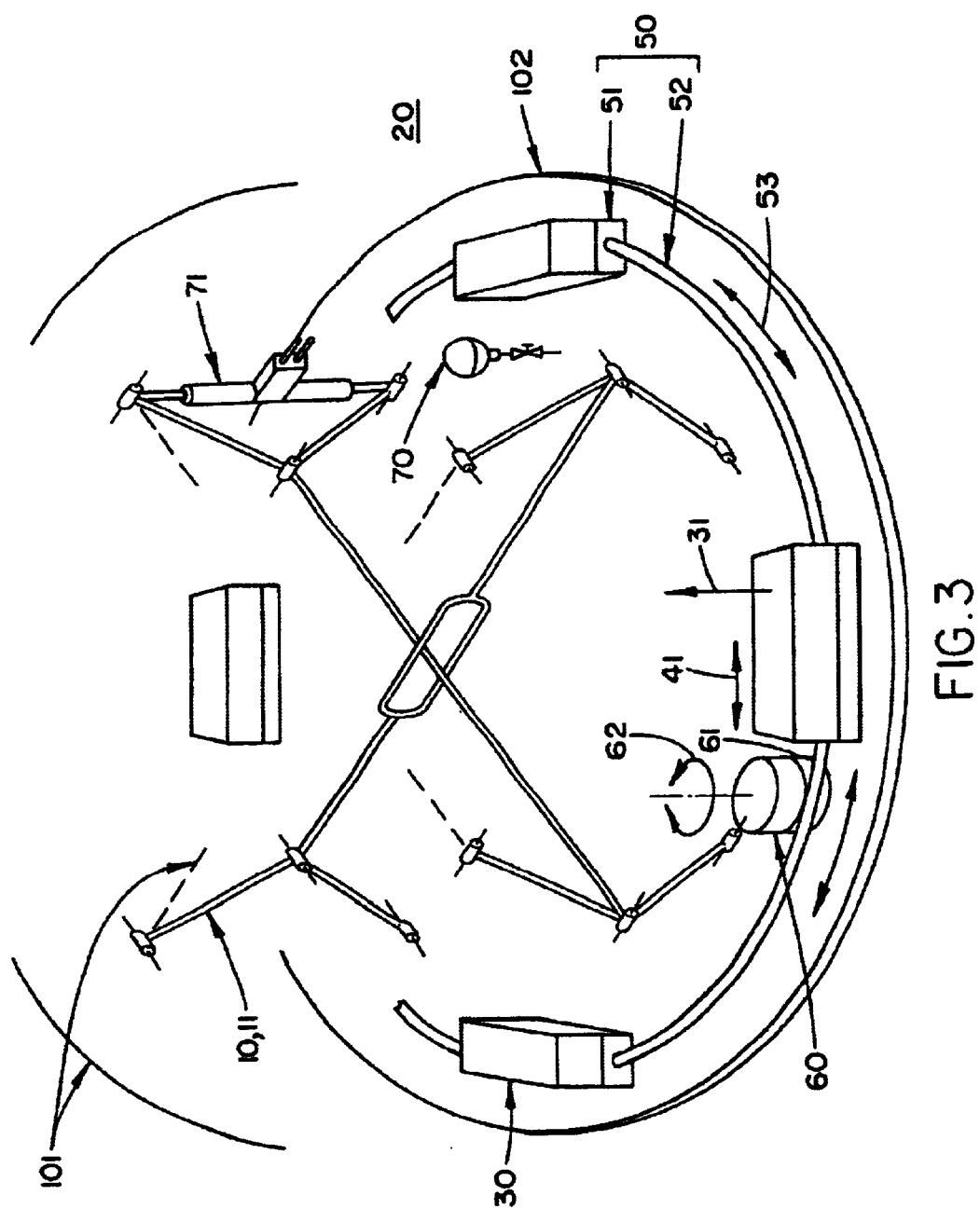
FIG. 3 illustrates a schematic diagram of the functional elements of a vibration isolation system of the present invention.

FIG. 3 is an isometric view of a preferred implementation of an entire vibration isolation system 20, supporting the payload 101 on the base structure 102. Only a small portion of the outline and some broken lines indicating the base of the payload 101 are shown, to make its relative location apparent without obscuring the view of isolation system 20 beneath it. Motion constraint means 10 comprised of two linkages prevents rotation of the payload 101 relative to the base structure 102, while allowing complete freedom for translational motion as described above in connection with FIG. 2. Vertical load support means 30 are shown in four locations, exerting vertical force 31 in opposition to the effective weight of the payload 101. As shown in FIG. 3, same support means 30 are also used to generate lateral restoring force 41 in opposition to the lateral motions of the payload 101 relative to the base structure 102. Thus, in this embodiment of the invention, the combination of motion contraint means 10 and support means 30 together provide complete control of the motion of the payload 101 relative to the base structure 102.

The vertical load support means 30 is adjustable to maintain the quasi-static deflection substantially constant in the presence of varying effective payload weight, for instance, in the case of a launch vehicle where the launch vehicle is accelerating and/or fuel in the payload is being consumed. Adjustment is effected by load support adjustment means 50, which includes local adjustment mechanisms 51 under each of the load support means 30, and adjustment coupling 52 which delivers mechanical power to each of the local adjustment mechanisms 51. Local adjustment mechanisms 51 may include cams or auxiliary linkages, for example, to adjust the effective preload force levels at the operating points of the load support means 30.

It will be understood that while local adjustment mechanisms 51 are shown to be underneath the load support means 30 in this embodiment, they may in fact be above or to the side or even within, or anywhere in sufficiently close proximity to the load support means 30 to permit manipulation of its structure and load bearing properties by, for example, changing its load bearing area or the mechanical advantage through which its elastic elements act in opposition to effective payload weight or by varying the pressure within the internal cavity or cavities of the elastic element or elements of the support means 30 as is later illustrated in the description of the preferred support element designs.

In the illustrated embodiment, adjustment coupling 52 is a rigid circular link which is driven by active driver means 60 to move by turning about the axis of its circular configuration in the direction of arrow 62, and in so doing to move substantially linearly through the local adjustment mechanisms 51 which straddle it along short arc sections of its length. More generally, however, adjustment coupling 52 can take other forms without its function being impaired. For example, it may be in the form of a long cable which is pulled by the active driver means 60 through the local adjustment mechanisms 51 over a path defined by the mechanisms and by any auxiliary pulleys or guides that may be appropriate. In yet another embodiment, adjustment coupling 52 may be one or a series of flexible shafts in torsion rather than tension, delivering mechanical power to local adjustment mechanisms 52 with rotary rather than linear motion.

In general, the adjustment coupling 52 may take various forms appropriate to suit the specific application conditions, with the primary objective of delivering mechanical power to a number of local adjustment mechanisms 51 from a smaller number of active driver means 60, and preferably from one such active driver means. The active driver means 60 is preferably a compressed gas rotary motor of the positive displacement type, in the illustrated embodiment with pinion gear 61 on its output shaft in driving communication with at least a segment of compatible ring gear on adjustment coupling 52, to convert its rotary motion 62 into the locally linear motion 53 of the adjustment coupling 52. Other embodiments are acceptable depending upon application conditions, including even electric motors and inherently linear drivers such as pneumatic cylinders.

The overall efficiency of energy supply, conversion and delivery will be a factor, especially where a limited supply of stored energy is utilized, and in some applications it may also be important to minimize overall system weight and volume.

The manner of driving communication between active driver means 60 and adjustment coupling 52 may also take other forms as required by conditions. For example as indicated above, adjustment coupling 52 may be in the form of a cable to be pulled through the local adjustment mechanisms 51, in which case pinion gear 61 may advantageously be replaced with a drum wound with preferably at least several turns of the cable of adjustment coupling 52.

In the illustrated embodiment, the active driver 60 is in fluid communication with compressed gas storage means 70 through control means 71. Control means 71 functions by sensing the distance between payload 101 and base structure 102, and permitting and controlling the flow of gas between the storage means 70 and the active driver means 60, and possibly also between the storage means 70 and the vertical support means to pressurize its internal cavity or cavities as required to maintain the distance between the payload 101 and the base structure 102 substantially constant at a desired reference level.

Figure 4A:
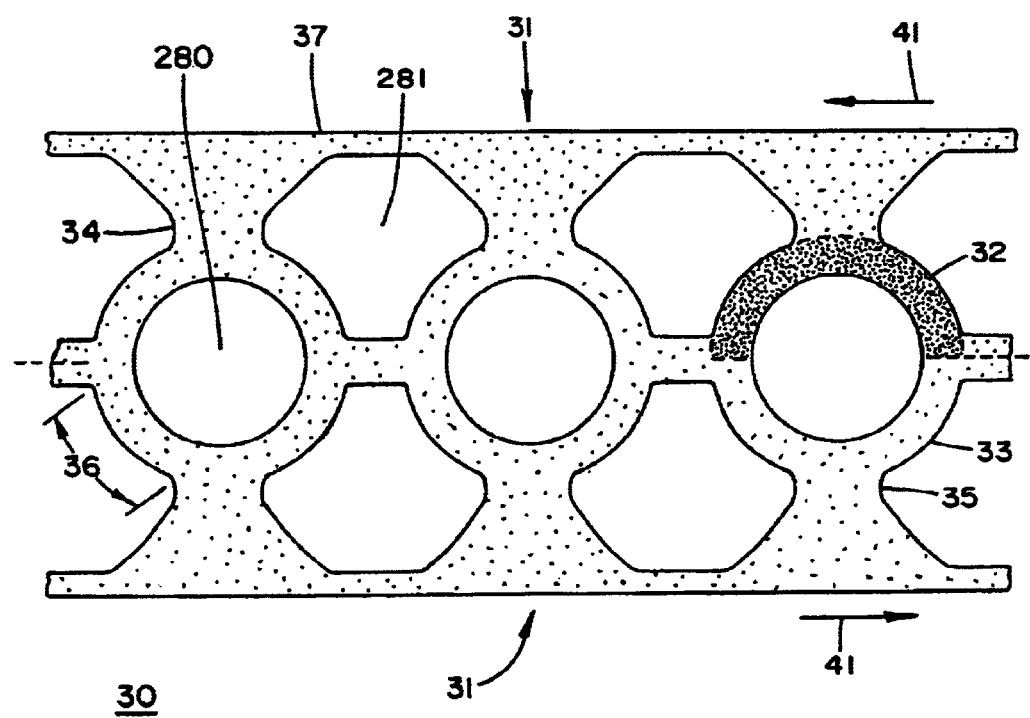
FIG. 4a illustrates a cross-sectional view of a vertical load support means with nonlinear force-deflection characteristics according to the present invention.

A: FIG. 4a shows a view of the cross section of a first preferred embodiment of the vertical load support means 30.

Preferably, the load support means 30 is comprised of arch-like support elements 32, which are combined in symmetrical pairs to form tubular support elements 33, of an elastomeric material such as polyurethane. The elastomeric material may be reinforced, as with a woven or mat-like fabric or random fibers, however, for best isolation performance, it is preferable that the material utilized have relatively low internal friction or damping properties. Moreover, while polyurethane is an appropriate material, readily available with suitable properties, it is cited here purely for the purpose of example and any elastomeric material with suitable properties is acceptable. The elasticity of the material is preferably in the range of about durometer 30A to 95A, and more preferably in the range of about durometer 70A to 90A.

One of the preferred designs of the vertical load support means 30 is an extrusion including two or more such elements in a horizontally disposed array of multiple parallel tubular support elements 33. The thickness of this array in the vertical direction will be determined by the radial dimensions of the tubular elements 33. Preferably, the internal radius of each such element should be approximately equal to or somewhat larger than the peak-to-peak amplitude of the vertical vibrational excitation being isolated.

By closing the open ends of the tubular elements 280 and the cavities in between them 281, preferably with a similar elastomeric material, the resulting spaces may be internally connected by interconnecting holes, and externally pressurized with gas from a gas source such as compressed gas storage means 70 to provide the vertical support means 30 with the capability to be adjusted to the varying quasi-static load preferably under the control of control means 71. The tubular elements are also preferably vented such that the adjustment can be made for either increasing or decreasing quasi-static load.

If the thickness of the arch elements 32 is small relative to its radius, then the arch will tend to buckle and its effective spring rate decreases dramatically when compressive load 31 reaches a critical threshold level. The support means 30 will then undergo considerable additional deflection, comparable in extent to about the size of the internal radius of the tubular elements 33, with relatively little or no increase in compressive load 31. Depending on details of its geometry and most particularly on the ratio of the thickness to radius of the arch elements 32, the effective spring rate of the arch at deflections within a range immediately above the threshold can even be made negative if desired.

At progressively larger deflections beyond the range of very low effective vertical spring rate, the tubular elements 33 approach a fully collapsed condition. The mode of deformation then changes from one of buckling to one approaching pure compression. Ultimately, at high deflections, the upper load support posts 34 are then in direct load bearing communication with the lower load support posts 35, with the characteristics of solid columns in compression, and the effective vertical spring rate again becomes extremely high.

Thus, the vertical load support means 30 provides an extremely nonlinear elastic characteristic as desired for the combination of stable load bearing capability and very low transmissibility of vibration, being relatively rigid both at low and at high levels of displacement, but extremely compliant at intermediate levels of displacement. Moreover, in a continuous mat-like configuration of the load support means 30 as shown in FIG. 4b, the vertical load supported at a reference level of deflection, such as about the center of the region of low spring rate, will be approximately proportional to the area of the mat under load.

It should be understood that load support means 30 will also exhibit an elastic characteristic in response to relative lateral motion, or shear, between its top and bottom surfaces 37. However, that characteristic will generally be substantially linear unless modified by other means, such as constraining linkages or mechanisms.

Figure 5:
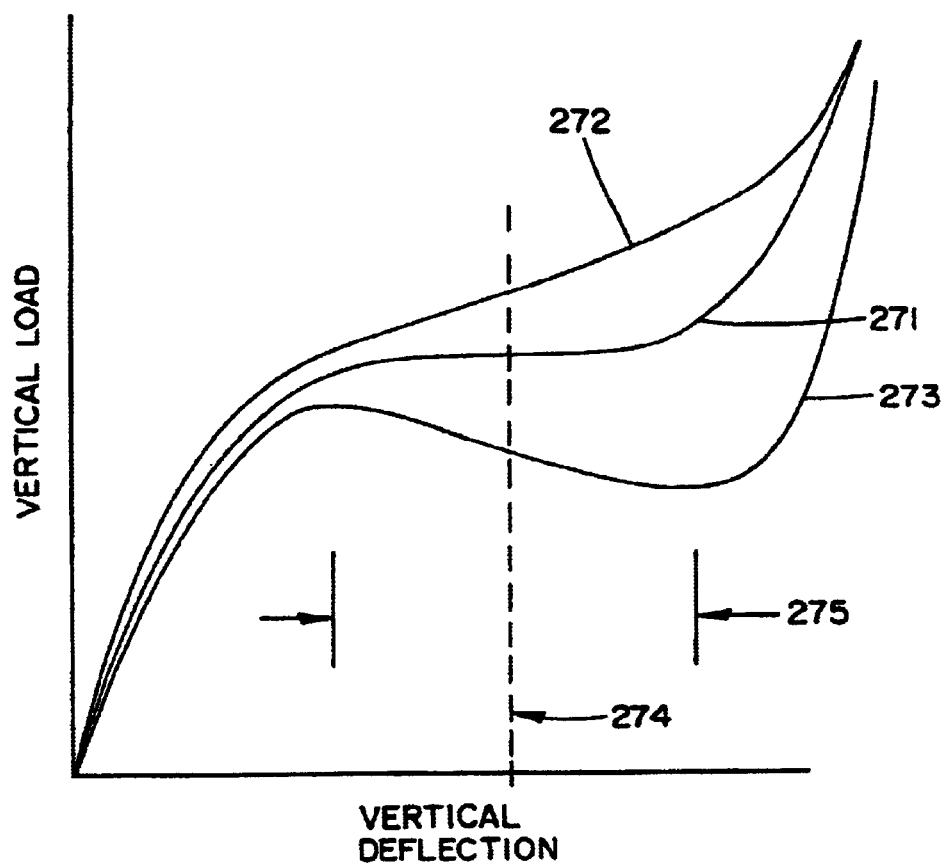
FIG. 5 is a graph illustrating the nonlinear variations in the force-deflection characteristics which accrue as a result of corresponding variation of geometric parameters of the load support means of FIG. 4.

FIG. 5 illustrates the nature of the variation in the vertical load-deflection characteristics of the load support means 30 of FIG. 4 that is usefully obtained by modifying its geometric parameters, particularly the shape of its arc and the ratio of thickness to radius of the arch elements 32. The middle curve 271 shows a spring rate that is zero or near zero over a substantial range of deflection 275 about operating point 274. Consequently, vibrations with peak-to-peak amplitude smaller than the extent of the range 275 of very low and substantially constant spring rate will be well isolated. However, the position of a load resting on support means 30 with this characteristic will be relatively susceptible to influence by small disturbances. The upper curve 272 shows a varying but consistently positive spring rate obtained by making the thickness to radius ratio of arch elements 32 relatively larger as compared with the middle curve 271. This characteristic can provide very effective isolation while still supporting a load firmly and with a high degree of stability. The lower curve 273 shows a characteristic with negative spring rate obtained by a relatively lower thickness to radius ratio of arch elements 32. Such a characteristic is unstable and would be generally undesirable in supporting a load, but could be useful, for example, if present in concert with and compensating for a more conventional linear elastic element, so that the two elements together would exhibit a combined characteristic similar to that of curve 271 or 272.

Figure 6A:
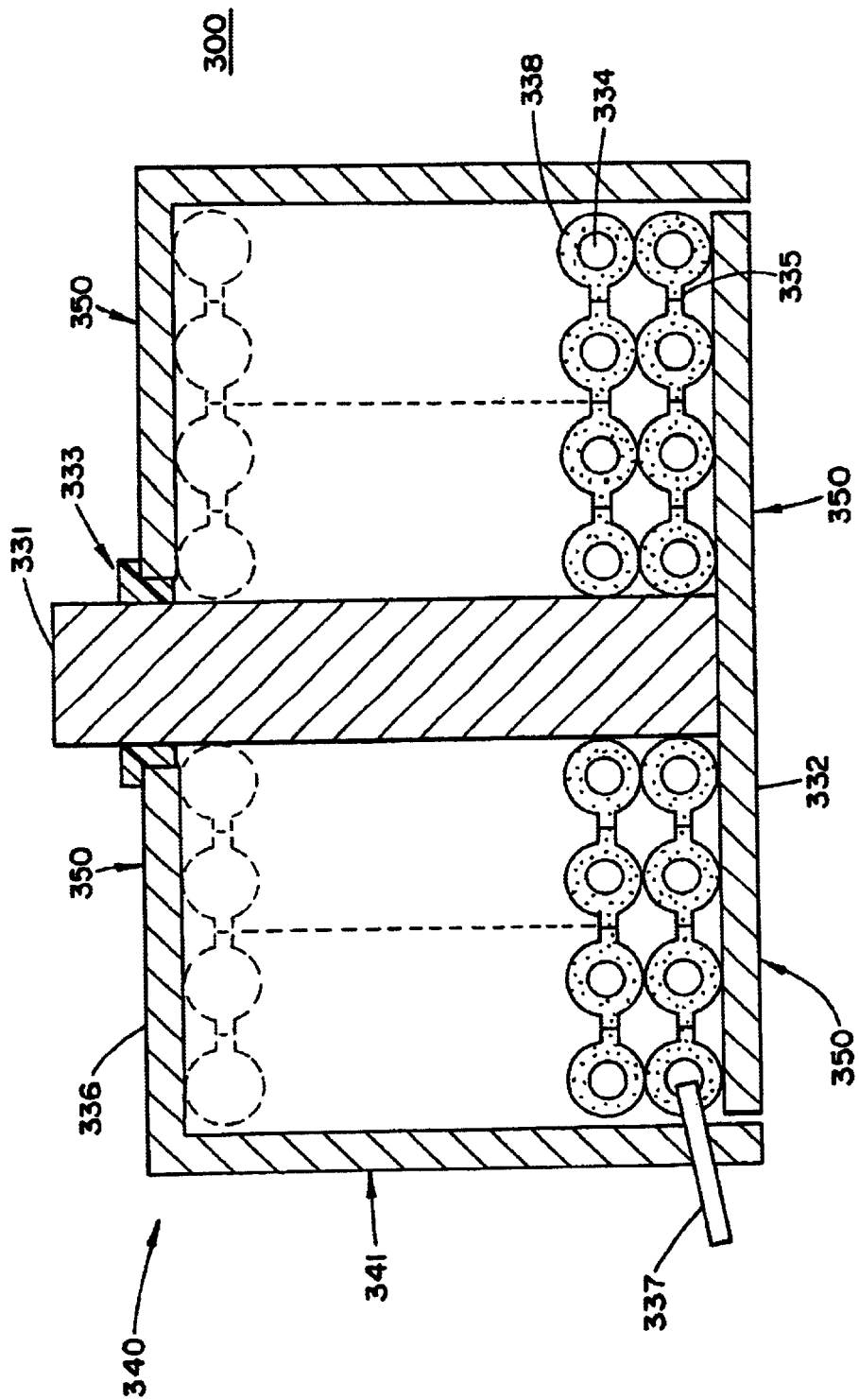
FIGS. 6a, and 6b illustrate cross-sectional views of a preferred vertical load support means with nonlinear force-deflection characteristics according to the present invention.
Figure 6B:
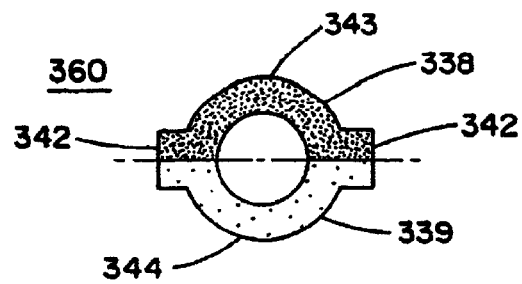

FIG. 6a shows a view of the cross section of a second preferred embodiment of the vertical load support means 30, here indicated as the vertical support means 300. In this design, a preferably extruded tubular element of elastomeric material 360 as shown in FIG. 6b and similar to those described for the elastomeric tubular elements in FIG. 4, with similar arch shape elements 338 and 339, are used to construct the vertical support element 300. The vertical support element 300 consists of a preferably cylindrical housing 340 with the side wall 341, a top 336, and a bottom plate 332. The top plate 336 is attached to one of the base or payload and the bottom plate 332 is attached to the other of the base or payload. A shaft 331 is attached rigidly to the center of the bottom plate 332 and rides in the bushing 333 to provide for free travel of the bottom plate 332 in the direction parallel to the long axis of the cylinder 341. Other means, such as sliding guides, linear ball bushings or mechanical linkages may also be used to constrain the bottom plate 332 to motions parallel to the long axis of the cylinder 341. The tubular elastomeric element is placed within the internal cavity of the vertical support element 300 by winding it like a rope in a helical manner to fill out the entire cavity. During the assembly, the contacting side surfaces 342 and the contacting top and bottom surfaces 343 and 344 of the tubular elastromeric element are preferably bonded by an appropriate adhesive material. The resulting vertical support means 300 would resist the compressive force 350 in a manner similar to that described for the vertical support means 30 and similarly exhibit a nonlinear load-deflection characteristic, which can be varied by varying the geometry of the tubular elastomeric element 360. material. The resulting vertical support means 300 would resist the compressive force 350 in a manner similar to that described for the vertical support means 30 and similarly exhibit a nonlinear load-deflection characteristic, which can be varied by varying the geometry of the tubular elastomeric element 360.

The tubular elastomeric element 360 within the cylindrical cavity of the vertical support means 300 has two open ends. By closing one and attaching the other end to an outlet 337, the cavity within the tubular elastomeric element can be pressurized with a desired gas such as from compressed gas supply means 70 and under the control of control means 71, thereby providing the vertical support means 300 with the capability to be adjusted to keep the distance between the top plate 336 and the bottom plate 332 relatively constant as the compressive load, i.e., the quasi-static load of the payload 101, is varied. Alternatively, the closed end can be provided with a vent also under the control of the control means 70. In this configuration, the top plate 336 is considered to be rigidly attached to the payload 101 and the bottom plate 332 is considered to be attached rigidly to the base structure 102.

In other configurations, the vertical support means 300 or the vertical support means 30 may be placed in series or in parallel with other linear and/or nonlinear spring and damper elements in one or more stages between the payload 101 and the base structure 102 to provide the isolation system with the desired dynamic characteristics.

Figure 7:
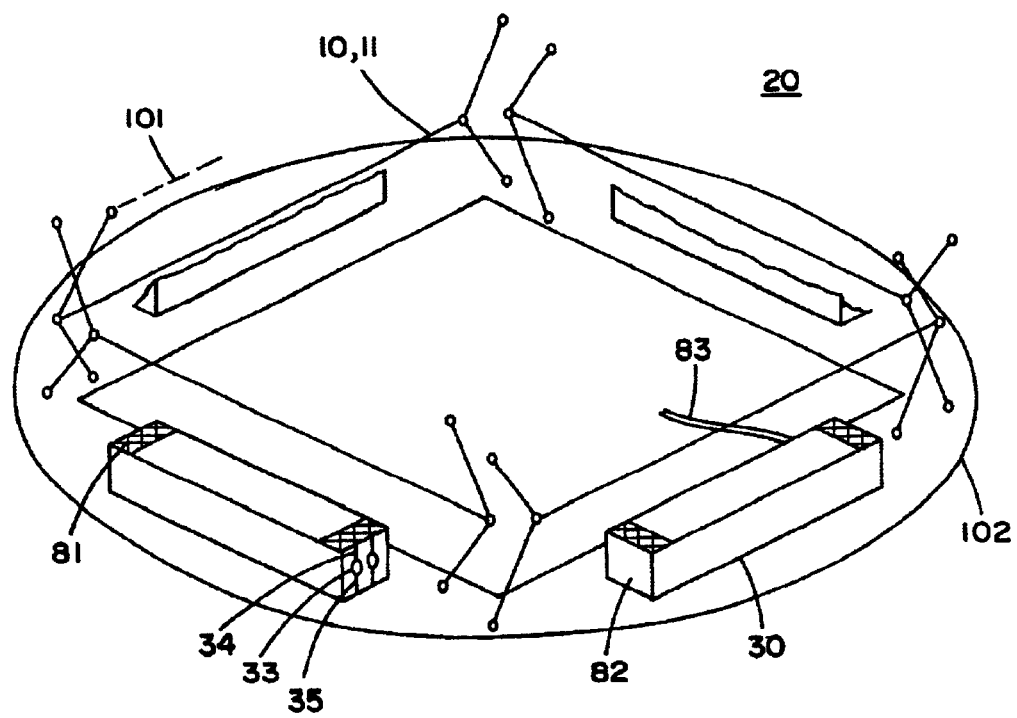
FIG. 7 illustrates a schematic diagram of a preferred embodiment of the vibration isolation system.

FIG. 7 illustrates another preferred embodiment of vibration isolation system 20 in which motion constraint means 10 is comprised of four linkages 11 arranged in a square array. The linkages 11 in the array are supported on base structure 102, which comprises the bottom horizontal link of each of the linkages 11. The payload 101, indicated by a dotted line, is not explicitly shown in this FIG. 7, but it will be understood that each of the linkages 11 is completed by payload 101 as its topmost horizontal link. As discussed previously, this configuration is more desirable in applications, such as a launch vehicle, where the center of the system must be free for other components, such as routing of electrical wires and the like.

The vertical load support means 30 are present as modules in four locations, specifically, one alongside each of the linkages 11. While structural connections are not shown, it is to be understood that the effective weight of the payload 101 rests upon and is borne by the load support means 30 acting in parallel. The load support means 30 in this embodiment include an internal structure of tubular support elements 33 and upper and lower load support posts 34 and 35, shown in the cutaway, as described in detail in connection with FIG. 4. The vertical load support means 30 is understood to be replaceable with the vertical support element 300 shown in FIG. 6.

In this embodiment of the invention, it is intended that the small portions shown crosshatched 81, of the upper surfaces of the load support means 30, are bonded or otherwise fastened to appropriate fixtures at the base of the payload 101. The remainder of the upper surfaces of load support means 30 are free to slide or otherwise move laterally in relative motion with respect to the payload 101. Thus, a relatively small portion of the elastic structure and the material of the load support means 30 will also flex in shear in response to lateral motion of payload 101 relative to base structure 102, and this small portion of load support means 30 will provide restoring force and elasticity for lateral isolation in addition to its primary vertical load support and isolation function.

It is further intended in this embodiment that the ends of each of the modules of the load support means 30 be covered and sealed with gas tight ends 82, in such a manner as to prevent any direct fluid communication between its interior and exterior, except through conduit means 83 which is preferably supplied gas by compressed gas supply means 70 and is under the control of control means 71. The internal pressure of load support means 30 can accordingly be varied and controlled, through conduit means 83, thereby also functioning as adjustment means to hold the quasi-static deflection of support means 30 substantially constant while supporting varying effective payload weight due to acceleration of the payload and/or a change in the mass of the payload. Preferably, only the interiors of the structural elements within the support means 30, such as tubular elements 33, are pressurized, rather than the entire interior of the support means, so that the differential pressure across the tube wall will raise the threshold level of the buckling to support a higher quasi-static load without significant deflection.

The functions of the load support adjustment means 50 and the active driver means 60 as described in connection with FIG. 3 are therefore combined in load support means 30, and the need for adjustment means 50 and the active driver means 60 as separate components is eliminated in this preferred embodiment. A control means and source of pressurized gas, corresponding to control means 71 and gas storage means 70 of FIG. 3, will be included in the preferred embodiment but are not shown in FIG. 7.

Figure 17:
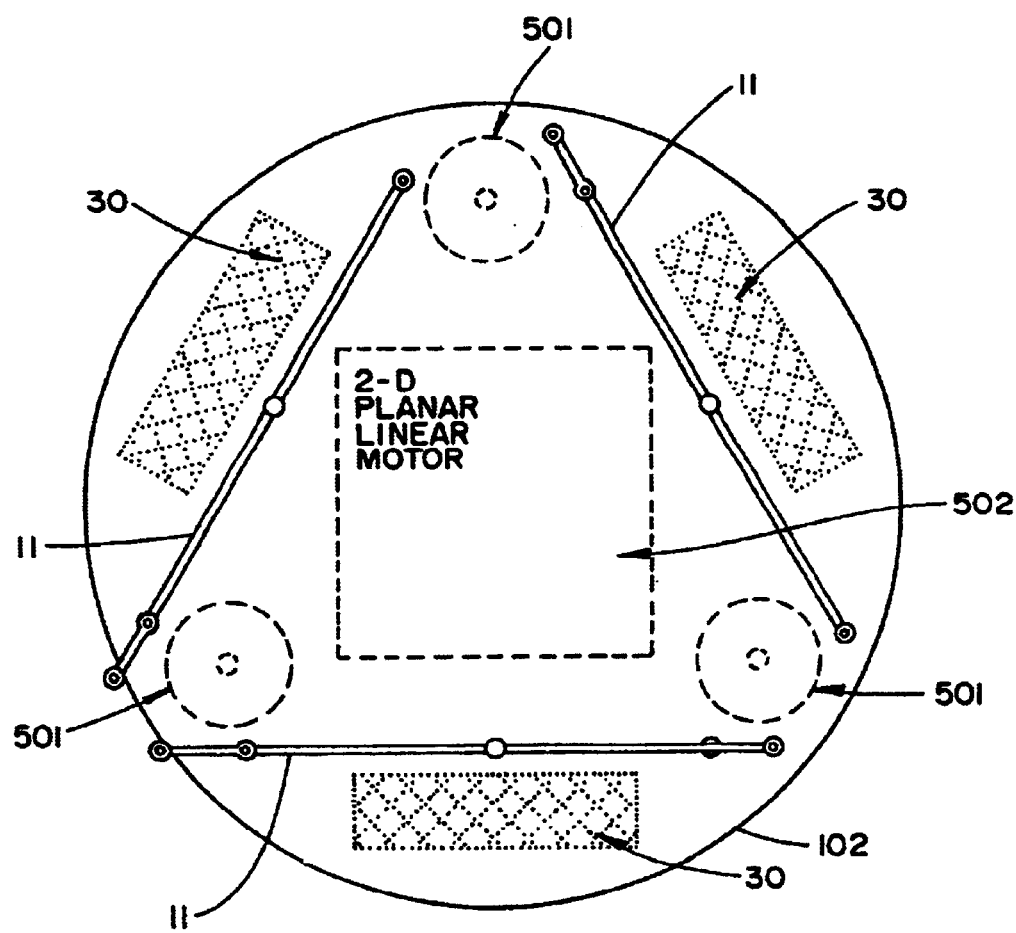
FIG. 17 illustrates a triangular configuration of motion constraint linkages and an active support means.

While FIG. 7 shows an array of four linkages 11, comprising the motion constraint means 10, and the load support means 30 distributed as four modules alongside the linkages 11, it will be understood that any number of such load support modules and linkages may be included as convenient in relation to the characteristics, for example, of the payload 101. For instance, FIG. 17 illustrates a configuration having three linkages 11 arranged in a triangular fashion. Moreover, while it is generally preferable that such an array be symmetrical, it should be recognized that it may on occasion be necessary or at least efficacious to provide isolation system 20 in a non-symmetrical form in order to most efficiently accommodate the range of possible payload and acceleration field conditions that will be encountered.

Figure 8A:
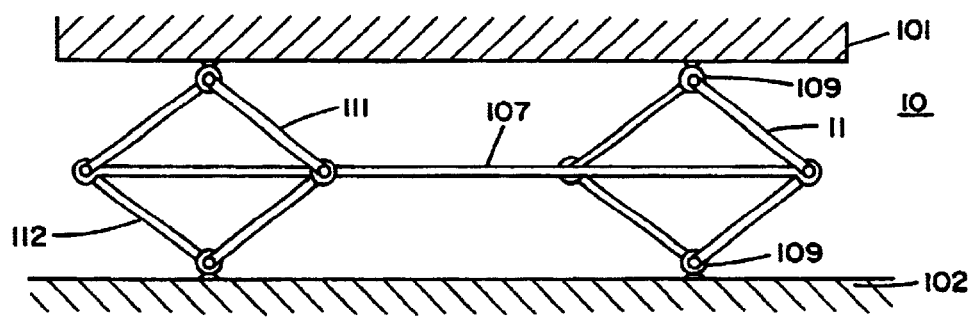
FIGS. 8a and 8b illustrate a set of dual opposed parallelogram linkages of the present invention, useful for controlling lateral translation as well as rotation.
Figure 8B:
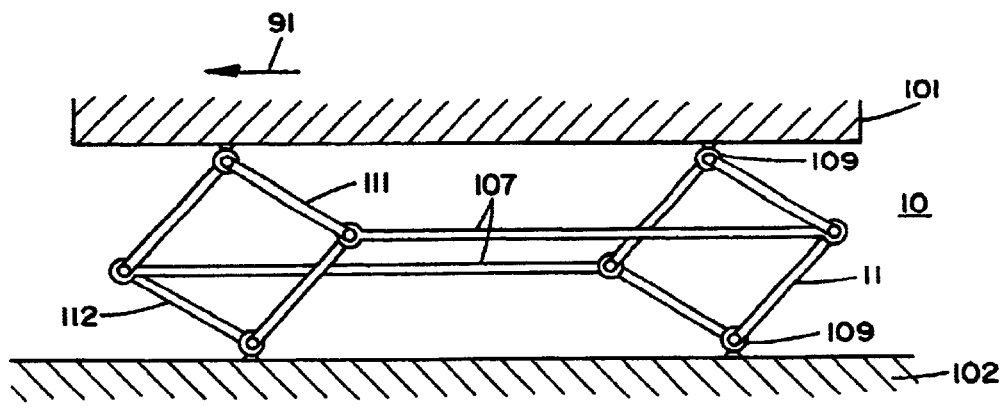

FIGS. 8a and 8b show a further embodiment of the motion constraint means 10 in which linkages 11, joining the payload 101 above and the base structure 102 below, are deployed as dual scissor linkages in pairs that are adjacent but opposed. The two substantially identical but opposed linkages in the pair are denoted 111 and 112, with linkage 112 being shown located behind linkage 111 in these illustrations. At each end of the linkages, the upper joint 109 of linkage 111 is substantially colinear with the upper joint 109 of the linkage 112, so that those two joints 109 can be considered a single joint for the purpose of kinematic characterization. Similarly, the bottom joints 109 at each end of the two linkages are also substantially colinear. Kinematically the two linkages exhibit the appearance and behavior of a pair of coupled scissors jacks, when centered and in the null position with respect to the lateral motion of the payload 101 relative to the base structure 102, as in FIG. 8a.

FIG. 8b shows the positions of linkages 111 and 112 when the pair is subjected to a small lateral motion 91 of the payload 101 relative to the base structure 102. The apparent scissors jack mechanisms at the two ends of the pair of linkages 111 and 112 give the appearance of being rotated, and the horizontal links 107 of the two linkages, which were perfectly one behind the other when the structure was centered as in FIG. 8a, move apart vertically.

It is clear that this vertical separation of the two horizontal links 107 must always necessarily accompany any such lateral motion 91 between the structures coupled by such dual opposed parallelogram linkages. Consequently, a convenient means is provided to elastically restrain the lateral motion of payload 101 for the purpose of vibration isolation, by elastically restraining the corresponding vertical separation of the two horizontal links 107. Such a means will be described more fully below with reference to FIG. 15.

Moreover, it is clear that the horizontal links 107 of the two linkages 111 and 112 are effectively beside each other in the horizontal plane when the two linkages are centered and in the null position as in FIG. 8a. Since the two horizontal links 107 are horizontally disposed but the relative motion between them is vertical, the elastic means simply connecting the two links to restrain their relative motion will inherently provide the highly nonlinear elastic characteristics that is desired, so that the effective spring rate of the motion constraint means 10 is extremely low for small lateral displacements of payload 101 but increases dramatically at large displacements.

It will be further understood that, although one set of dual opposed parallelogram linkages is shown in FIGS. 8a and 8b for the purpose of clearly revealing the manner of its operation, any number of such sets may be utilized as convenient to isolate a specific payload. Moreover, a single set may contain multiple rather than dual linkages, as expedient, for example, to maintain symmetry or adequate structural rigidity, but then with a redundancy of opposed linkages that are kinematically similar to, and can be functionally reduced to, two opposed linkages.

Figure 9:
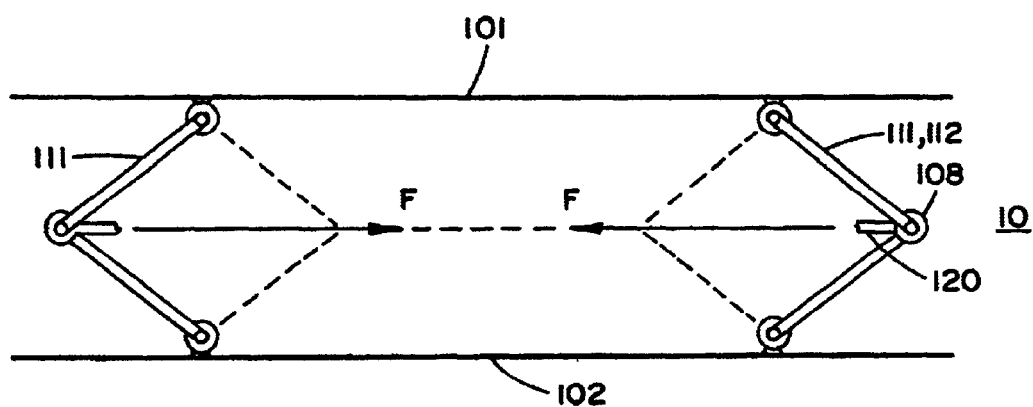
FIG. 9 illustrates a schematic diagram of an embodiment of the dual opposed parallelogram linkages with the capability of also supporting vertical loads.

FIG. 9 schematically illustrates a further embodiment of motion constraint means 10 with opposed dual parallelogram linkages 11, denoted 111 and 112, in which motion constraint means 10 is also used to support the effective weight of the payload 101 on the base structure 102. In this embodiment, at least one of the joints 108 of linkage 111 is in communication with at least one of the joints 108 of linkage 112, through load bearing means 120, so that the full function of a scissors jack is developed. Load bearing means 120 transmits force "F" between the joints 108 of the two linkages 111 and 112.

The load bearing means 120 preferably includes at least a portion with sufficient elasticity so that the motion constraint means 10 provides isolation of the vertical vibration while it is supporting the effective weight of payload 101. Moreover, still preferably, the load bearing means 120 includes means for maintaining its overall length between the two joints 108 substantially constant despite variations in the effective weight of payload 101, by compensating for changes in the length of its elastic portion that will accompany variations in the preload level of force "F". Such a means will be described more fully below with reference to FIG. 14.

Figure 10A:
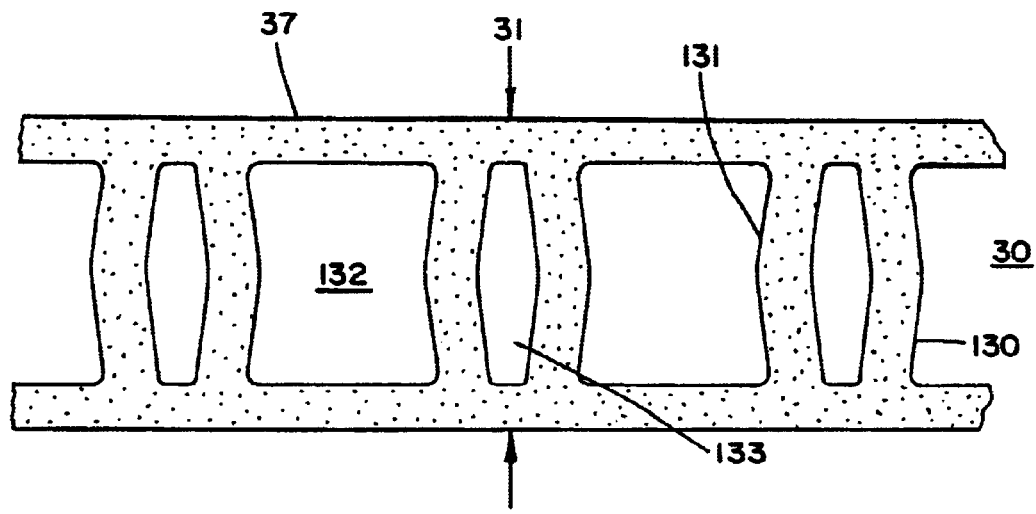
FIG. 10a and 10b illustrate cross-sectional views of an alternative embodiment of vertical load support means according to the present invention, showing the support means respectively with and without an applied lateral load and deflection.

FIG. 10a shows a cross sectional view of another alternative embodiment of the vertical load support means 30. It is comprised of a series of columnar elements 130, of an elastomer material such as polyurethane, which are nearly vertical except for a slight bow in each column to predispose the direction of its deformation under vertical compressive load. For example, column 131 is bowed to the left, so it will buckle in that direction under the load 31. Preferably, the support means 30 of FIG. 10a is an extrusion, with the tops of columns 130 connected by stabilizing horizontal surface 37, as are the bottoms, so that the entire load support means 30 gives the external appearance of a continuous mat similar to mat 30 illustrated in FIG. 4b. The thickness of each column 130 is so proportioned with respect to its height that the effective spring rate of the column in the vertical compression is highly nonlinear and is extremely high at both low deflections and at high deflections comparable to the height of the column, corresponding substantially to the elastic properties of the material in compression, and relatively low at intermediate deflections, corresponding to the deflection of the column in a buckling mode.

Preferably, the columns are in pairs and the directions in which they are slightly bowed are such that the two columns of each pair are predisposed to buckle in opposite directions.

Figure 10B:
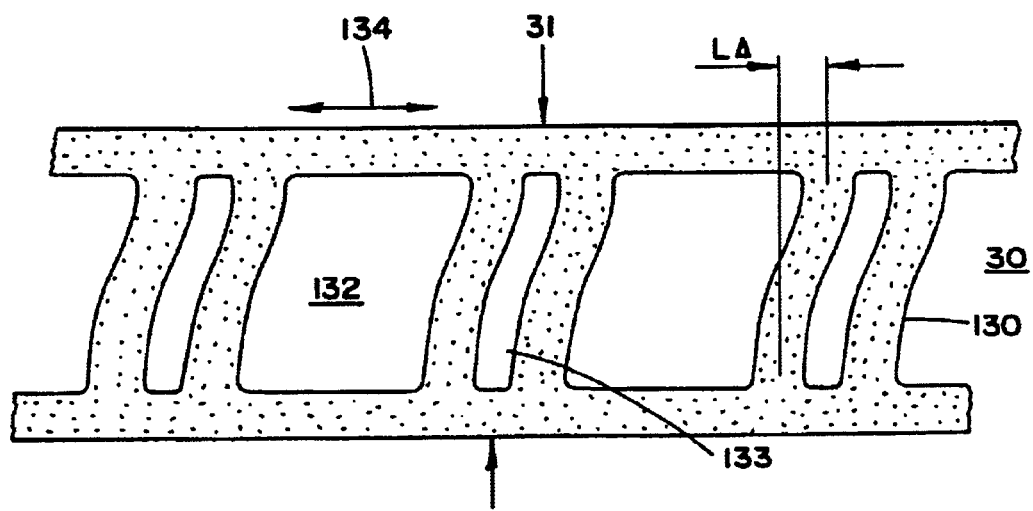

Thus, many of the properties of this embodiment are in if common with that described in connection with FIG. 4, including the range of its elastic characteristics in the vertical direction. However, this embodiment differs in its behavior when subject to lateral deflection as illustrated in FIG. 10b, which shows the columns uniformly deflected by a distance αL in the lateral direction, in the direction perpendicular to the column structures if they are continuous extrusions.

This embodiment is deflected relatively easily in the direction indicated, so it can be conveniently used not only to isolate vertical vibrations when preloaded due to compressive load 31 to the partially buckled condition, but also to isolate small lateral vibrational motions 134 in the direction parallel to ΔL. Moreover, a laminate of at least two such support means 30, one above the other, oriented so that their internal extruded column structures 130 are not parallel and are preferably orthogonal to each other, can provide isolation with respect to small lateral vibrational motions in any direction in the lateral plane, as well as isolating vertical vibrations. The term "small", in this context, means small enough so that the lateral displacement does not automatically generate significant variations in the vertical displacement under the vertical compressive load 31.

Moreover, this embodiment is compatible with several methods to adjust support means 30 for variation in the quasi-static vertical load. First, by displacing the columns 130 laterally to the extent of large deflections in the direction of ΔL, its vertical characteristic is changed so that a level of vertical deflection may correspond to any vertical compression load 31 within a range, and the extent of that range is a function of the extent of the range of displacement ΔL that is imposed for the purpose of such control. Second, the entire structure may be pressurized, by filling both large cavities 132 and small cavities 133 with a compressed gas such as air or nitrogen from compressed gas supply means 70 and under the control of control means 71. Also, large cavities 132 may be selectively pressurized while small cavities 133 remain at low pressure.

The cavities 132 are large enough to accommodate the material of columns 130 when they have buckled into those cavities. However, cavities 133 are only present to define a separation of adjacent columns and are therefore generally much smaller than cavities 132. When support means 30 is compressed, columns 130 buckle into the cavities 132. The presence of a pressure gradient across the columns 130, from a higher pressure in cavities 132 to a lower pressure in cavities 133, in opposition to the direction of buckling motion, will raise the threshold level of buckling to support a higher quasi-static load without significant deflection.

Finally, it should be noted that the effective quasi-static load bearing capability of load support means 30, which is the load 31 at which its deflection will be in the vicinity of the center of its operating range as illustrated in FIG. 5, is substantially proportional to the footprint area within which the compressive load 31 is in communication with, bears upon and is supported by the continuous mat-like form of support means 30. Therefore, the load support means 30 can be adjusted for varying effective payload weight by changing its load bearing footprint area.

Figure 11:
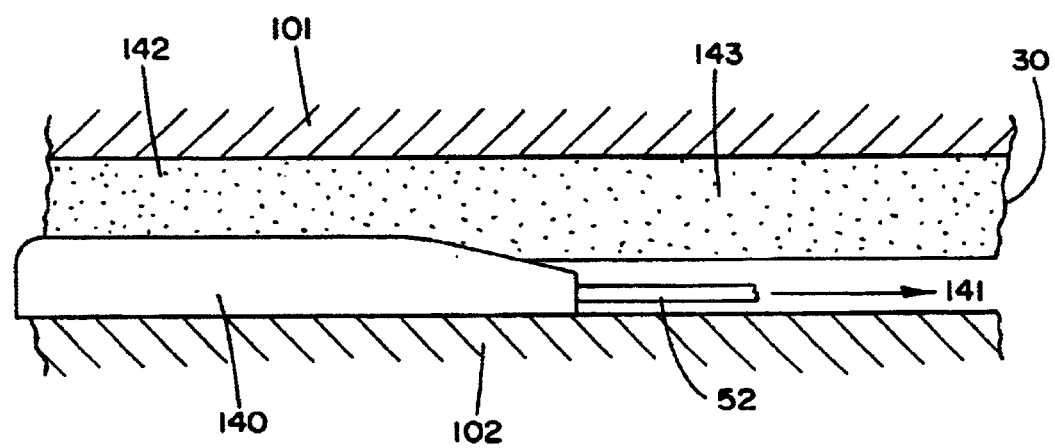
FIG. 11 illustrates a section diagram of a linear cam mechanism disposed to adjust the quasi-static load bearing capability at an operating point of the vertical load support means.

A mechanism to effect this adjustment of quasi-static load bearing capability, by changing the effective footprint area within which the load 31 bears upin load support 30, is illustrated in FIG. 11 in which 140 is a sliding cam (alternatively referred to as a ramp) which is pulled by adjustment coupling 52 under a structure which includes load support means 30. The sliding cam 140 slides upon a surface of or affixed to base structure 102, and the payload 101 is above and rests on the support means 30. As the cam 140 undergoes motion 141 to the right, it lifts an increasing area of support means 30 into the load bearing position, where it is then held by well known latching means so that, for example, a portion 142 of support means 30 is in load bearing position where sliding cam has 140 has passed and lifted it, but another portion 143 ahead of the cam 140 is slack and uncompressed and makes no contribution to the support of the load 31 because it has not yet been lifted into position by the cam 140. In this manner, the compressive pressure exerted by the payload in the form of force 31 on the mat-form of support means 30 remains nominally constant.

While the mechanism illustrated for the purpose of the example in FIG. 11 is a linear cam, it should be understood that numerous well known types of mechanisms exist including, for example, rotary cams and linkages, which can be adapted to the service of moving portions of the area of support means 30 into load bearing position, and the use of other such well known mechanisms would be within the scope and spirit of the present invention.

It will be apparent that such a mechanism directed to modifying the effective load bearing area of the load support means 30 provides a convenient means of adjusting the isolation of vibrations for variations in effective payload weight either manually or automatically, to optimize and obtain the lowest practical natural frequency of isolation and also to maintain the height of payload 101 above base structure 102 substantially constant and uniform.

The present invention is also directed to means of automatically controlling the mechanism which adjusts the load support means 30 for varying effective payload weight. Referring again to FIG. 3, the control means 71 function by sensing the distance between payload 101 and base structure 102, and permitting and controlling the flow of gas between a high pressure storage means 70 and active driver means 60, and possibly also between active driver means 60 and a lower gas pressure which may be an exhaust, not shown, as required to maintain the distance between the payload 101 and the base structure 102 substantially constant at a desired level.

Figure 12:
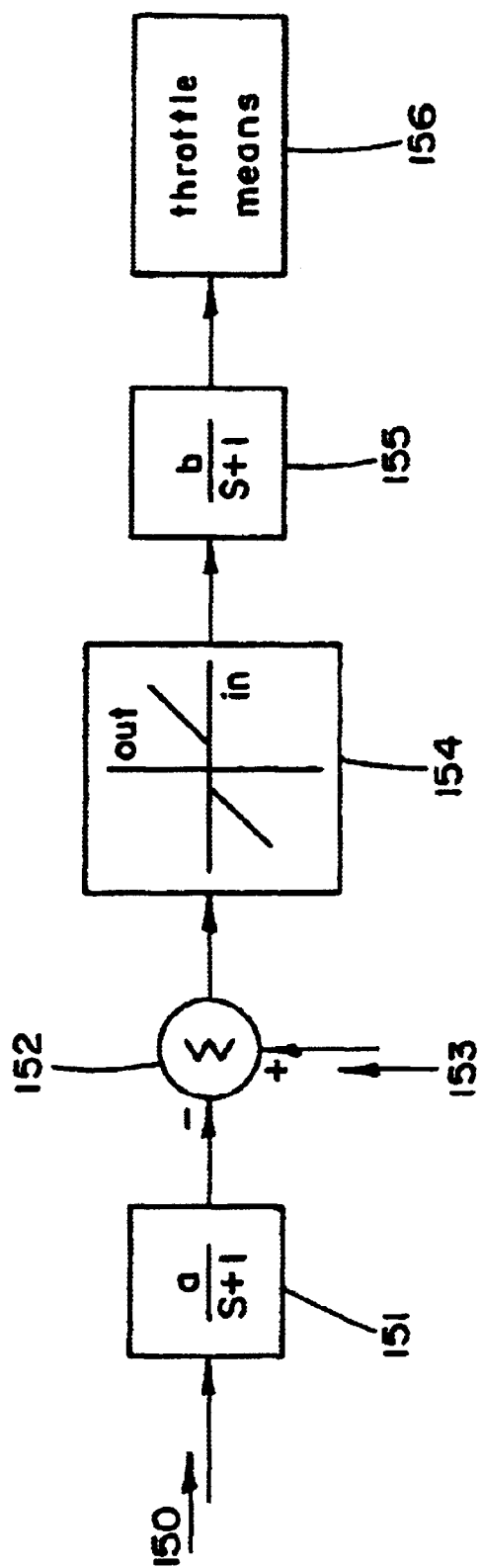
FIG. 12 illustrates a block diagram of the preferred control means to maintain the load support means at its operating point in the presence of variable quasi-static loads.

This peumatic control means is cited as a preferred embodiment for the purpose of example, but the essential function of control means 71 is more generally as depicted in the block diagram of FIG. 12, in which a distance or level signal in some form 150, is first preferably passed through first low pass filter means 151, then through summer 152 which compares the filtered signal with a reference level 153, followed by a gain 154 with deadband. Gain 154 may, but need not, be substantially linear outside the region of the deadband. The output from gain 154 is preferably passed through second low-pass filter means 155, and then to a throttling transducer 156.

The functions of these elements of control means 71 are as follows. First low pass filter 151 converts a position signal 150, including a very low frequency bias upon which is superimposed a relatively high frequency vibration component of significant amplitude, into a slowly varying signal representing average position along with a small high frequency ripple component. Summer 152 subtracts the reference 153 to provide an output error signal generally near zero in amplitude except for the small high frequency ripple. Gain 154 with deadband then generally passes only vibrational peaks, either positive or negative, indicative of a shift in the average input signal from the reference level.

That signal, of peaks separated by intervals of substantially zero signal level, then is preferably passed to second filter 155, where it is averaged into a relatively smooth positive or negative final error signal which is passed to throttling transducer means 156. The throttling transducer means 156 responds to the final error signal that reaches it by modulating and directing available power, which may preferably be pneumatic in form but may also be, for example, electrical or hydraulic, to actuator means, not shown, to drive the position signal 150 back toward the reference level 153.

FIG. 17 illustrates another embodiment of the present invention. In this embodiment, like previously discussed, two or more of the parallelogram linkages 11 keep the base structure 102 parallel to the payload 101 (not shown in FIG. 17). However, at least part of the vertical support of the payload is provided by one or more voice coil motors 501.

The voice coil motors are used to provide vibration isolation of the payload. The voice coil motors may also be used to provide the force required to compensate for variations in the effective weight of the payload. Additionally, the payload is isolated from lateral vibrations by two-dimensional linear motors 502. A variation of this embodiment includes the motors 501, 502 in combination with the vertical load support means 30 shown in FIGS. 4, 6, or 16 or air springs to provide the means to compensate for variations in the effective weight of the payload. The vertical support means may also provide spring and damping means in the vertical and/or lateral directions.

IF gain 154 with the deadband were not present, then the signal reaching throttling transducer means 156 would include both an average error signal and a high frequency component reflecting the vibration being isolated, which could be substantial, and throttling transducer means 156 would be attempting to respond to an alternating positive and negative signal. The alternating error signal would lead to a drain on stored energy, which may be severely limited, as well as to constant vibrational chattering of the mechanisms being controlled by the control means 71, even if the average of that signal was zero and no net motion as required.

In the most optimal configuration with respect to position control, the width of the deadband in gain 154 is made a function of the vibration being isolated, being always just wider than the peak-to-peak amplitude of vibration. In this manner, the control means 71 will respond to any shift in the very low frequency bias of the input position signal 150 so that the error in position is always very near zero. However, this is a degree of sophistication which,it is believed, will be required only in a minority of application. More commonly, a fixed deadband with width greater than the peat-to-peak amplitude of the most severe expected vibration will be sufficient.

If the form of power being modulated by throttling transducer means 156 is not electrical, then preferably the control elements 151, 152, 154 and 155, and the form of signals 150 and 153, will also not be electrical. For example, if the power being modulated is pneumatic, then the signals and control elements may also be pneumatic or, still preferably, mechanical in their form.

Figure 13:
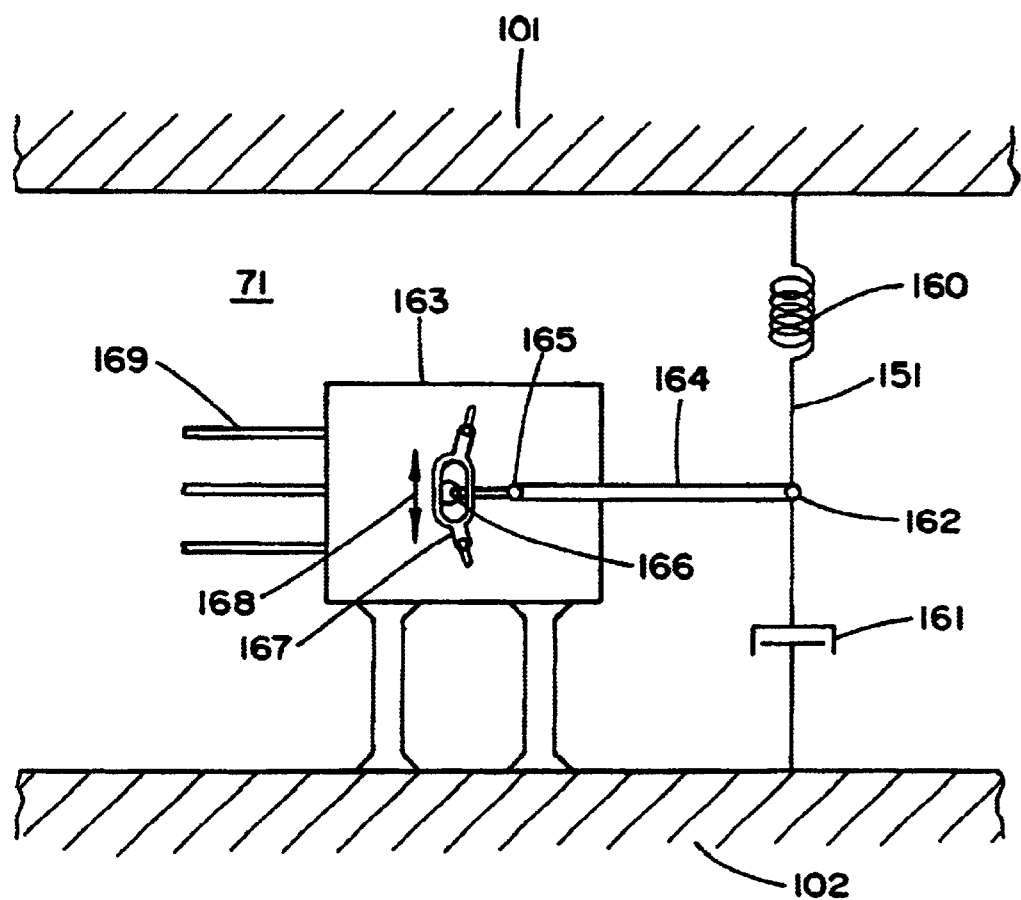
FIG. 13 illustrates a schematic representation of a pneumatic control means according to the block diagram of the preferred control means of the present invention.

The elements of the control means 71, described in connection with FIG. 12, may advantageously be embodied in mechanical form as illustrated schematically in FIG. 13, which represents the class of applications in which the form of power being modulated is pneumatic. In FIG. 13, the elastic element 160 and viscous friction element 161 together bridge the gap between the payload 101 and the base structure 102, or between points which proportionally represent that gap. The gap between the payload 101 and the base structure 102 is potentially variable in length reflecting the motion of the payload with respect to the base structure, and it will be apparent that the combination of elastic element 160 and viscous element 161 is a flexible member 151 capable of accommodating variations in the length of that gap.

Referring to point 162 on the flexible member 151, it will be apparent from the dynamic characteristics of the elements 160 and 161 that the ratio of the distance between the point 162 and the base structure 102, divided by the distance between the payload 101 and the base structure 102, is not constant but depends upon the frequency of motion of the payload with respect to the base structure. Specifically, that ratio will decrease at high frequencies. The response of the member 151 to the motion of the payload 101, measured at point 162, therefore constitutes a low-pass filter as represented by first low-pass filter means 151 of FIG. 12.

A valve means 163 is in communication with the point 162 on the low-pass filter member 151 via valve handle 164 which is pinned at one end to point 162 and free to rotate about a pivot 165 on the valve means 163. The valve means 163 is rigidly positioned a fixed distance from the base structure 102. Therefore, the relationship of the position of handle 164 with respect to the valve means 163, driven by the point 162 on the low-pass filter member 151, constitutes the mechanical analog of the summer 152, and the fixed position of the valve 163 relative to the base 102 functions as the reference level 153, of FIG. 12. The position of the handle 164 relative to the valve means 163 represents the output of the summer 152.

Pushing means 166 in FIG. 13 is situated so that it will push against and move slotted link 167 in directions 168 in response to significant motion of handle 164 relative to valve means 163. However, the slot provides sufficient clearance about pushing means 166 so that, in the absence of significant motion of the payload 101 relative to the base 102, the link 167 will not be pushed and moved by the attenuated vibrational motion of the payload 101 that passes through the first filter means 151 to the handle 164. The combination of the pushing means 166 in the slot of slotted link 167 therefore functions as the gain with deadband 154 of FIG. 12.

Preferably, the valve means 163 contains internally at least one second filter means, not shown, comparable in its dynamic function to first filter 151 and corresponding to second filter means 155 of FIG. 12. The function of the second filter is to smooth the motion 168 of the slotted link 167, which is jerky in character in response to peaks of vibrational motion of the pushing means 166 that makes contact with and pushes against the inside of the slot of the link 167. This smoothed motion then drives the variable orifice means, not shown, which is internal to and is the essential function of the valve means 163 and corresponds to the throttle means 156 of FIG. 12. Still preferably, the valve means 163 contains two such second filter means to drive two variable orifice means, one of which provides pneumatic power for upward motion, and the other of which provides pneumatic power or relief for downward motion, of the payload 101, through port connections 169. Thus, the control means 71 provides and performs the dynamic functions described in connection with the block diagram of FIG. 12, in a purely mechanical form for efficiency and simplicity.

It should be understood that this mechanical embodiment of the function of the block diagram of FIG. 12 is presented for the purpose of example and that many variations in detail are possible. For example, infinite variations are possible in the form of links and filter means, provided only that they perform the dynamic functions described. The slotted link 167 is shown as a single element that may move either upward or downward depending on the relative motion of payload 101, but could in fact be replaced by two links, one responding in the upward direction and one in the downward direction. The number and type of port connections will depend on the nature of the actuator or actuators being driven.

In the extreme, the control means 71 may include a single valve means 163 as shown, pneumatically controlling the payload motion both upward and downward, or it may include two such valve means connected to drive in opposing directions, or even multiple valve means depending on the requirements of other equipment with which it is in communication. Thus, it is apparent that the essential feature of the mechanical embodiment of the control means 71 is its function as an analog, and it may take many different mechanical forms without departing from the scope and spirit of the present invention.

Figure 14:
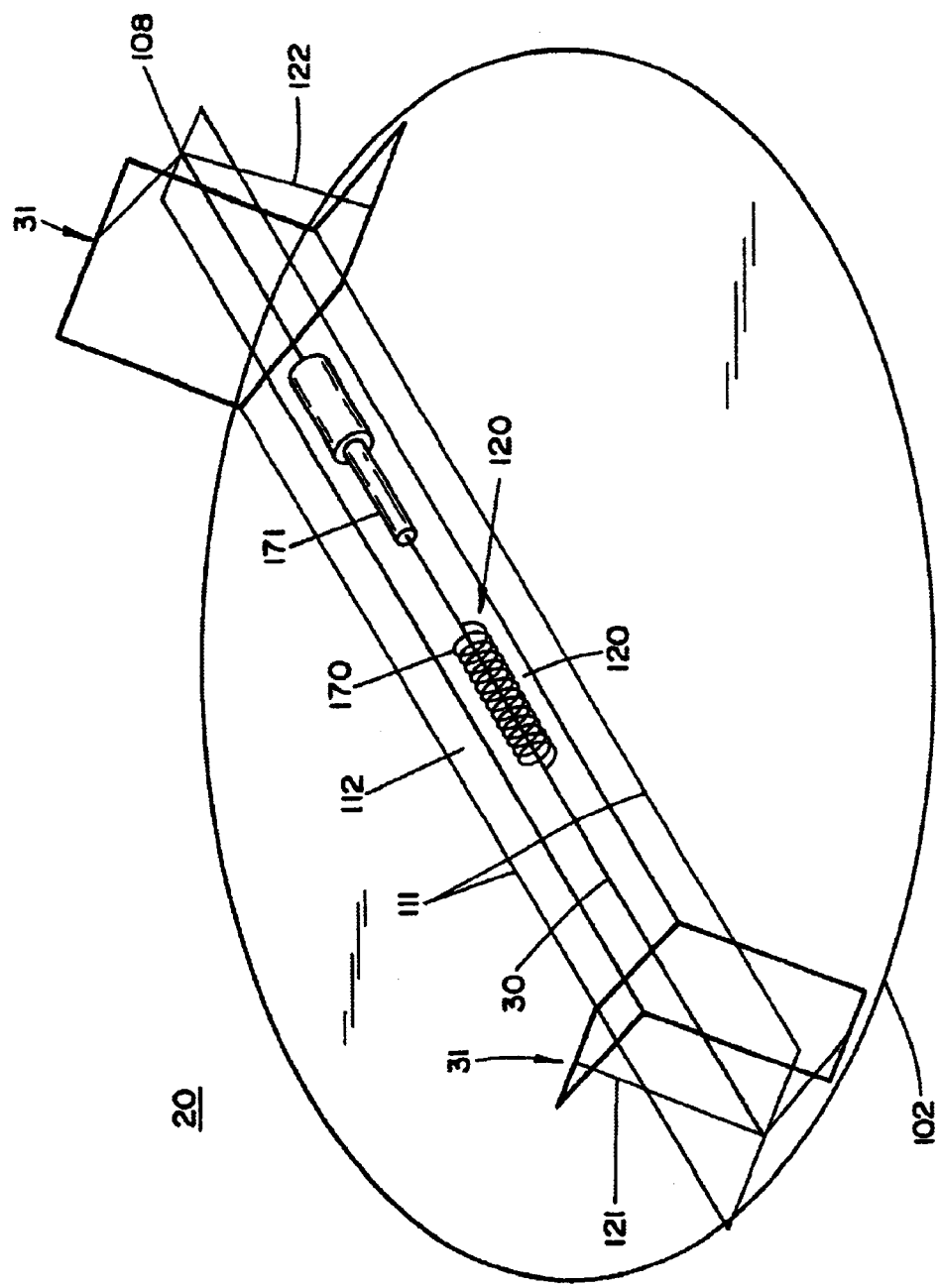
FIG. 14 illustrates a schematic diagram of several components of an alternate embodiment of the disclosed vibration isolation system of the present invention.

FIG. 14 illustrates the primary load bearing and motion control components of an alternate preferred embodiment of vibration isolation system 20 mounted on the base structure 102, utilizing the load support structural arrangement and functioning as described in connection with FIGS. 8*a* and 8*b*, in which motion constraint means 10 is also used to support the vertical force 31 due to the effective weight of a payload, not shown. For the purpose of symmetry there are effectively two each of opposed linkages 111 and 112, with one of each on either side of load support means 30 which connects joints 108 of the vertical load support links 121 and 122. It should be noted that as many of the linkages 111 and 112, and even as many of the support links 121 and 122, as are efficacious to support prevailing load and vibration conditions, may be provided in parallel and in duplicate.

The load support means 30 includes spring means 170 and linear actuator means 171 in series and exerts the tensile force holding the two joints 108 from spreading apart, thereby making support links 121 and 122 load bearing in the manner of a scissors jack. The linear actuator 171 may be, for example, a pneumatic motor in combination with a drive screw, which drive screw may advantageously be, for example, an acme screw or a ball screw and clutch, so as to lock in place without the constant expenditure of power when not required to move.

Figure 15:
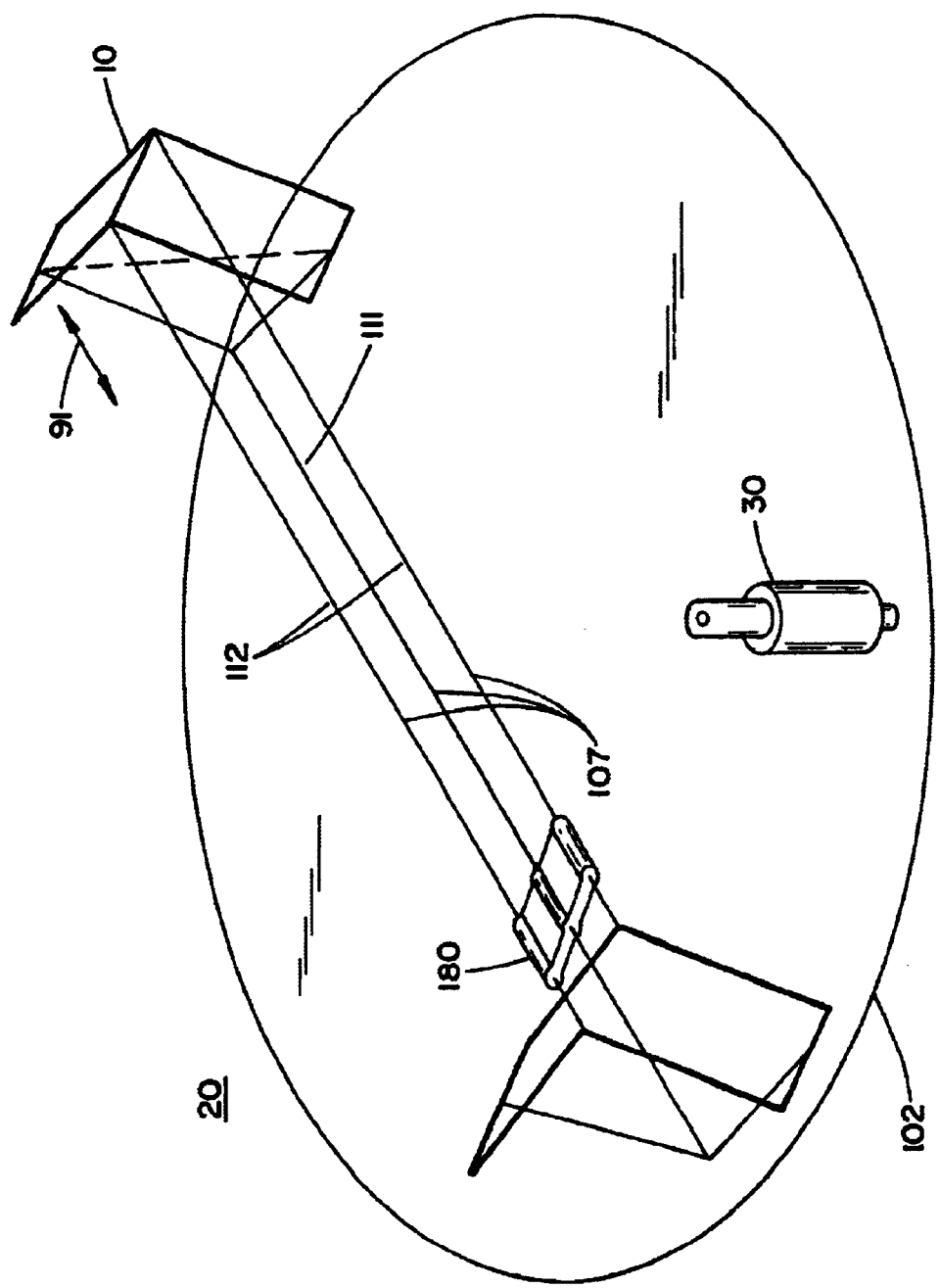
FIG. 15 illustrates a schematic diagram of several components of a second alternate embodiment of the disclosed vibration isolation system of the present invention.

FIG. 15 illustrates the primary load bearing and motion control components of a second alternative preferred embodiment of the vibration isolation system 20 of the present invention, mounted on the base structure 102. The motion constraint means 10 in this embodiment is comprised of dual opposed parallelogram linkages 111 and 112 as described in connection with FIGS. 8*a* and 8*b*, but one of the linkages, here denoted 112, is actually a redundant pair of linkages such that one of the linkages 112 is located on each side of linkage 111.

The vertical load support means 30 in this embodiment is in the form of air springs, one of which is illustrated, which are easily adjusted by the addition or removal of compressed gas to compensate for variations in the effective weight of the payload, not shown, supported upon isolation system 20. Elastic means 180 restrains the tendency of the horizontal links 107 of linkage 111 to separate vertically from those of linkage 112 when there is relative lateral motion 91 between the tops and the bottoms of the linkages of the motion constraint means 10. Elastic means 180 is preferably free to slide on the horizontal links 107 of either linkage 111 or 112. It therefore provides the highly nonlinear effective spring rate, in response to lateral motion, that is desired for effective lateral vibration isolation and stability. Elastic means 180 may advantageously be comprised of a moderately firm strapping material.

One set of linkages 111 and 112 is shown and it should be understood that at least one other, not shown, will be present and will preferably be orthogonal to the one shown. Also, this embodiment of the isolation system 20 will preferably include at least two, and still preferably at least four, of the air spring support means 30. Moreover, it is expected that it will be advantageous to provide elastic means 180 over an extended length of the horizontal links 107, though preferably about the two ends.

It will be understood that appropriate control and pressurized gas source means, not shown, will also be included in this embodiment of the invention, to add or remove compressed gas as required to maintain the gas springs of support means 30 at the proper level.

In a further alternative embodiment of the vertical load support means, one or more arch-like support elements, constituted of an elastomeric material, each such arch element effectively comprising the semicircular top or bottom of a tube, in compressive load bearing communication with load support posts such that the vertical load remains concentrated at the center of each arch, are mounted on a relatively rigid base such that the arches cannot expand horizontally when under vertical load. The thickness of each arch is so proportioned with respect to its radius that the effective spring rate of the arch in vertical compression is highly nonlinear and is extremely high at both low deflections and at high deflections comparable to the internal radius of the arch, corresponding substantially to the elastic properties of the material in compression, and relatively low at intermediate deflections, corresponding to the deflection of the arch in a buckling mode.

Figure 16:
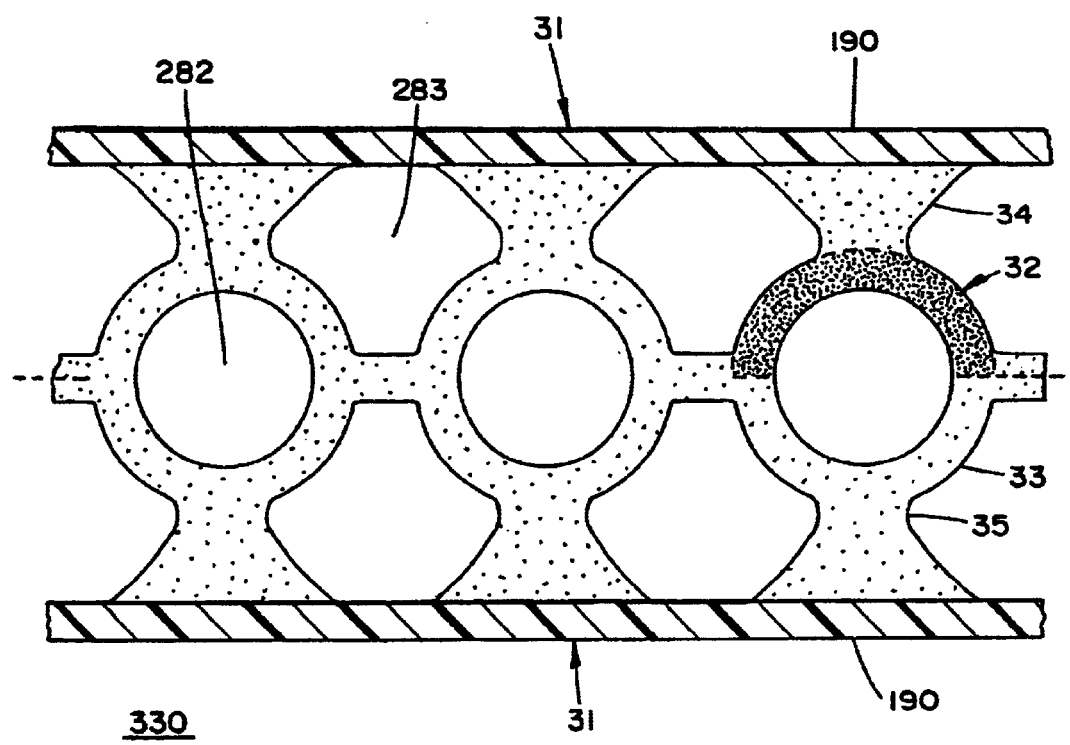
FIG. 16 illustrates a cross-sectional view of a further alternative embodiment of vertical load support means according to the present invention.

FIG. 16 shows a view of the cross section of such an alternative embodiment of the vertical load support means 30 shown in FIGS. 4*a* and 4*b*, indicated as 330 in FIG. 16, which is a continuous mat-like array of multiple parallel arches 32 and 33 constituted of an elastomeric material, in which each such arch effectively comprises the semicircular top or bottom of a tube. The arches 32 and 33 are in compressive load bearing communication with load support posts 34 and 35 such that the vertical load 31 remains concentrated at the center of each arch, and are mounted on relatively rigid bases 190, such as a sheet of steel, such that they cannot expand horizontally when under the vertical load 31 such as of the payload 101 on the rigid base 190, which may also be the base structure 102 supporting and isolating the payload. In FIG. 16, and for the purpose of illustration, only one layer of this mat-like structure is shown for the vertical load support 330. In practice, however, two or more such layers may be stacked as needed to provide the required support and spring-rate. In such assemblies, one of the two rigid bases 190 may be eliminated between each two mat-like layers.

In other respects, the embodiment illustrated in FIG. 16 is similar to that of FIGS. 4*a* and 4*b* so that, for example, the support means 330 according to these embodiments can also be adjusted for variation in the vertical load 31 by changing its load bearing footprint area or by varying its internal pressure, either in the entire interior of load support means 330 or, for example, selectively in the cavities 282 and/or 283 to raise or lower the threshold level of force required to buckle these structures.

While the invention has been described in connection with the preferred embodiments of the system and its functional components, it is not intended to limit the invention to the particular forms set forth but, on the contrary, it is intended to cover such alternatives, modifications and equivalents as may be included within the spirit and scope of the invention as defined by the appended claims.

What is claimed is:

1. A payload isolation system for isolating a payload from a base structure upon which the payload is supported, the payload isolation system comprising:

motion constraint means for maintaining a parallel relationship between the payload and the base structure throughout a range of motion, the motion constraint means comprising at least two parallelogram linkages, each of the at least two parallelogram linkages comprises first and second parallelogram sub-linkages, each of the first and second parallelogram sub-linkages having first and second supporting links the first and second supporting links for each of the first and second parallelogram sub-linkages being connected to a common member, the first and second supporting links for one of the first or second parallelogram sub-linkages being directly fixed to only the payload or a portion thereof through first rotating joints, the first and second supporting links for the other of the first or second parallelogram sub-linkages being directly fixed to only the base structure or a portion thereof through second rotating joints; and support means being deformable along the range of motion for providing vertical and/or lateral support of the payload relative to the base structure such that the transmission of vertical and/or lateral vibration between the payload and the base structure are suppressed.

2. The payload isolation system of claim 1, wherein at least two of the at least two parallelogram linkages are configured non-parallel to each other.

3. The payload isolation system of claim 1, wherein at least a portion of the vertical and/or lateral support is provided by actuators arranged to apply a vertical and/or lateral force against the payload.

4. The payload isolation system of claim 1, further comprising damping means for resisting relative displacement and/or velocity between the payload and base structure.

5. The payload isolation system of claim 1, wherein at least one of the at least two parallelogram linkages comprises a scissor linkage having first and second scissor sub-linkages disposed between the payload and base structure, the first and second scissor sub-linkages being connected to each other by first and second common members, a first end of each of the first and second scissor sub-linkages being only fixed to the payload or a portion thereof and a second end of the first and second scissor sub-linkages only being fixed to the base structure or a portion thereof.

6. The payload isolation system of claim 5, wherein the at least one scissor linkage comprises two or more scissor linkages, at least two of the two or more scissor linkages being configured non-parallel to each other.

7. The payload isolation system of claim 5, wherein the support means comprises a spring means and a linear actuator means in series disposed on one of the first or second common members.

8. The payload isolation system of claim 5, wherein the support means comprises an elastic means for biasing the first and second common members together.

9. The payload isolation system of claim 1, wherein the support means provides one of vertical or lateral support of the payload relative to the base structure.

10. The payload isolation system of claim 1, wherein the support means provides both vertical and lateral support of the payload relative to the base structure.

11. The payload isolation system of claim 1, wherein the support means comprises a deformable mat having at least one internal tubular cavity such that the deformable mat exhibits nonlinear elastic characteristics in response to an effective weight of the payload.

12. The payload isolation system of claim 11, wherein the non-linear elastic characteristics comprise a substantially rigid characteristic at low and high levels of deformation and a compliant characteristic at intermediate levels of deformation.

13. The payload isolation system of claim 11, wherein the at least one internal tubular cavity comprises a plurality of internal tubular cavities interconnected to each other such that the plurality of internal tubular cavities act as a single cavity.

14. The payload isolation system of claim 1, wherein the support means comprises a bottom plate fixed to one of the payload or base structure or portions thereof, a top plate movable relative to the bottom plate and fixed to the other of the payload or base structure or portions thereof, the support means further comprising a compressible material disposed in a space between the top and bottom plates.

15. The payload isolation system of claim 14, wherein the space between the top and bottom plates defines an annular cavity and wherein the compressible material disposed in the space is an elastomeric extruded tubular element, the elastomeric extruded tubular element having a tubular cavity running therethrough and being coiled within the space in a helical manner to thereby fill the space.

16. The payload isolation system of claim 1, further comprising a payload adjustment means for adjusting the level of support of the support means in response to a variation in an effective payload weight, and/or a variation in a relative distance between the payload and the base structure.

17. The payload isolation system of claim 16, wherein the payload adjustment means comprises:

support adjustment means for adjusting the level of support of the support means; and a feedback means for sensing a change in relative distance between the payload and the base structure and controlling the support adjustment means in response thereto.

18. The payload isolation system of claim 17, wherein the support means comprises:

a deformable mat having at least one internal tubular cavity; and wherein the support adjustment means comprises:

a gas source in communication with the at least one internal cavity;

wherein the feedback means controls the gas pressure level in the internal tubular cavity in response to the change in relative distance between the payload and the base structure.

19. The payload isolation system of claim 17, wherein the support adjustment means comprises:

a bottom plate fixed to one of the payload or base structure or portions thereof;

a top plate movable relative to the bottom plate and fixed to the other of the payload or base structure or portions thereof;

an elastomeric extruded tubular element disposed in an annular cavity defined between the top and bottom plates, the elastomeric extruded tubular element having a tubular cavity running therein and being coiled within the space in a helical manner to thereby fill the space; and a gas source in communication with the tubular cavity;

wherein the feedback means controls the gas pressure level in the tubular cavity in response to the change in relative distance between the payload and the base structure.

20. The payload isolation system of claim 17, wherein the support adjustment means comprises:

a deformable mat having at least one internal tubular cavity; and a ramp means for engaging the deformable mat to vary an amount of surface area of the deformable mat in operative contact with the payload; and drive means for driving the ramp means between locations to vary the amount of surface area of the deformable mat in operative contact with the payload;

wherein the feedback means controls the drive means to change the amount of surface area of the deformable mat in operative contact with the payload.

21. The payload isolation system of claim 17, wherein the feedback means comprises:

distance signal generation means for generating a distance signal proportionate to the sensed relative distance between the payload and the base structure;

a first low pass filter for converting the distance signal into a slowly varying signal representing average position along with a small high frequency ripple component;

a summer for subtracting a reference signal from the slowly varying signal to provide an output error signal;

a gain means for outputting a signal indicative of vibrational peaks from an input of the error signal;

a second low pass filter for averaging the vibrational peaks signal into a final error signal; and a throttling transducer means for responding to the final error signal which is input to the support adjustment means thereby more efficiently controlling the support adjustment means and reducing vibrational chattering of the support adjustment means.

22. The payload isolation system of claim 1, wherein the payload and base structure are components of a rocket and wherein the effective weight of the payload varies with time.

23. The payload isolation system of claim 1, wherein the support means comprises one or more of the following:

a deformable mat having at least one internal tubular cavity such that the deformable mat exhibits nonlinear elastic characteristics in response to an effective weight of the payload;

at least one first motor disposed between the payload and base structure for providing vertical support of the payload, the at least one first motor being under the control of a control means in response to detected vertical disturbances of the payload relative to the base structure; and at least two second motors disposed between the payload and base structure for providing lateral support of the payload, the at least two second motors being under the control of a control means in response to detected lateral disturbances of the payload relative to the base structure.

24. A motion constraint mechanism comprising:

a first parallelogram linkage disposed between a payload and a base structure; and at least one second parallelogram linkage arranged relative to the first parallelogram linkage such that the first and at least one second parallelogram linkages maintain a parallel relationship between the payload and the base structure throughout a range of motion;

wherein each of the first and at least one second parallelogram linkages comprise first and second parallelogram sub-linkages, each of the first and second parallelogram sub-linkages having first and second supporting links, the first and second supporting links for each of the first and second parallelogram sub-linkages being connected to a common member, the first and second supporting links for one of the first or second parallelogram sub-linkages being directly fixed to only the payload or a portion thereof through first rotating joints, the first and second supporting links for the other of the first or second parallelogram sub-linkages being directly fixed to only the base structure or a portion thereof through second rotating joints.

25. The motion constraint mechanism of claim 24, wherein at least one of the first and at least one second parallelogram linkages are arranged non-parallel to each other.

26. The motion constraint mechanism of claim 24, wherein at least one of the first and at least one second parallelogram linkages comprises a scissor linkage having first and second scissor sub-linkages disposed between the payload and base structure, the first and second scissor sub-linkages being connected to each other by first and second common members, a first end of each of the first and second scissor sub-linkages being fixed to the payload or a portion thereof and a second end of the first and second scissor sub-linkages being only fixed to the base structure or a portion thereof.

27. The motion constraint mechanism of claim 26, further comprising support means for providing vertical and/or lateral support of the payload relative to the base structure such that the transmission of vertical and/or lateral vibration between the payload and the base structure are suppressed.

28. The motion constraint mechanism of claim 26, wherein the support means comprises a spring means and a linear actuator means in series disposed on one of the first or second common members.

29. The motion constraint mechanism of claim 26, wherein the support means comprises an elastic means for biasing the first and second common members together.

30. The motion constraint mechanism of claim 24, further comprising support means for providing vertical and/or lateral support of the payload relative to the base structure such that the transmission of vertical and/or lateral vibration between the payload and the base structure are suppressed.

31. A method of constraining motion between a payload and a base structure, the method comprising the steps of:

providing a first parallelogram linkage disposed between the payload and the base structure;

providing at least one second parallelogram linkage disposed between the payload and the base structure;

directly fixing first and second supporting links for a first parallelogram sub-linkage from each of the first and at least one second parallelogram linkages only to the payload or a portion thereof through first rotating joints and directly fixing first and second supporting links for a second parallelogram sub-linkage from each of the first and at least one second parallelogram linkages only to the base structure or a portion thereof through second rotating joints; and arranging the first and at least one second parallelogram linkages relative to each other such that the first and at least one second parallelogram linkages maintain a parallel relationship between the payload and the base structure throughout a range of motion.

32. The method of claim 31, wherein the arranging step comprises configuring the first and at least one second parallelogram linkages non-parallel to each other.

33. The method of claim 31, further comprising the step of providing vertical and/or lateral support of the payload relative to the base structure such that the transmission of vertical and/or lateral vibration between the payload and the base structure are suppressed.

34. A support apparatus for providing vertical and/or lateral support of a payload relative to the base structure such that the transmission of vertical and/or lateral vibration between the payload and the base structure are suppressed, the support apparatus comprising:

support means for supporting the effective payload weight, the support means comprising a deformable member exhibiting nonlinear elastic characteristics in response to an effective payload weight; and effective payload adjustment means for adjusting the level of support of the support means in response to a varying effective payload weight;

wherein the deformable member comprises a bottom plate fixed to one of the payload or base structure or portions thereof, a top plate movable relative to the bottom plate and fixed to the other of the payload or base structure or portions thereof, the deformable member further comprising a compressible material disposed in a space between the top and bottom plates, the space between the top and bottom plates defining an annular cavity and wherein the compressible material disposed in the space is an elastomeric extruded tubular element, the elastomeric extruded tubular element having a tubular cavity running therein and being coiled within the space in a helical manner to thereby fill the space.

35. The support apparatus of claim 34, wherein the non-linear elastic characteristics comprise a substantially rigid characteristic at low and high levels of deformation and a compliant characteristic at intermediate levels of deformation.

36. The support apparatus of claim 34, wherein the effective payload adjustment means comprises feedback means for sensing a change in relative distance between the payload and the base structure and controlling the support adjustment means in response thereto.

37. The support apparatus of claim 36, wherein the support adjustment means comprises a gas source in communication with the tubular cavity wherein the feedback means controls the gas pressure level in the tubular cavity in response to the change in relative distance between the payload and the base structure.

38. The support apparatus of claim 36, wherein the feedback means comprises:

distance signal generation means for generating a distance signal proportionate to the sensed relative distance between the payload and the base structure;

a first low pass filter for converting the distance signal into a slowly varying signal representing average position along with a small high frequency ripple component;

a summer for subtracting a reference signal from the slowly varying signal to provide an output error signal;

a gain means for outputting a signal indicative of vibrational peaks from the input of the error signal;

a second low pass filter for averaging the vibrational peaks signal into a final error signal; and a throttling transducer means for responding to the final error signal which is input to the support adjustment means thereby more efficiently controlling the support adjustment means and reducing vibrational chattering of the support adjustment means.

* * * * *